Sept 10, 1957 G. F. H. VON STROH ET AL 2,805,761
SURGE CAR APPARATUS
Filed July 21, 1955 11 Sheets-Sheet 1
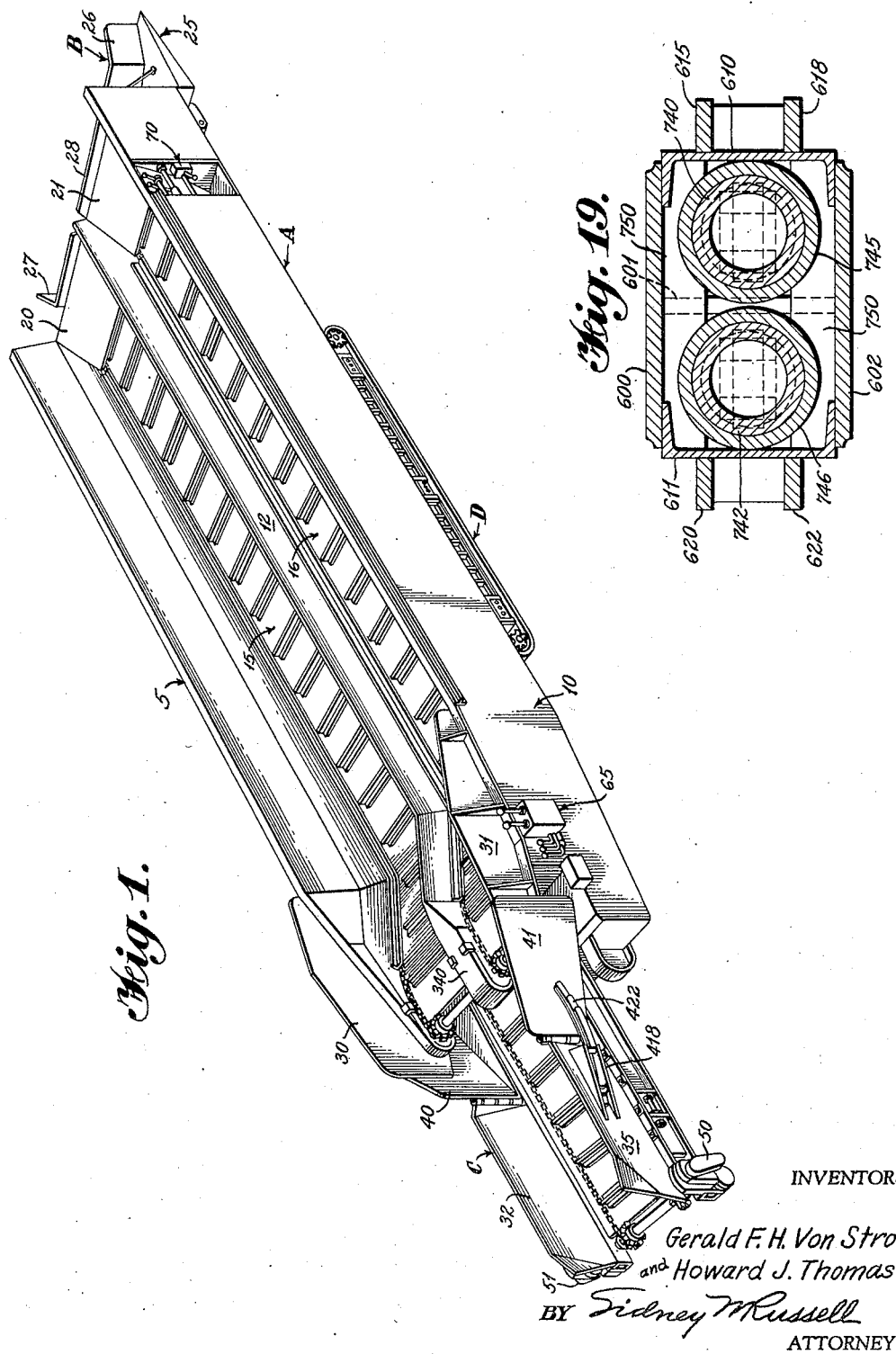
INVENTORS
Gerald F. H. Von Stroh
and Howard J. Thomas
BY Sidney M Russell
ATTORNEY

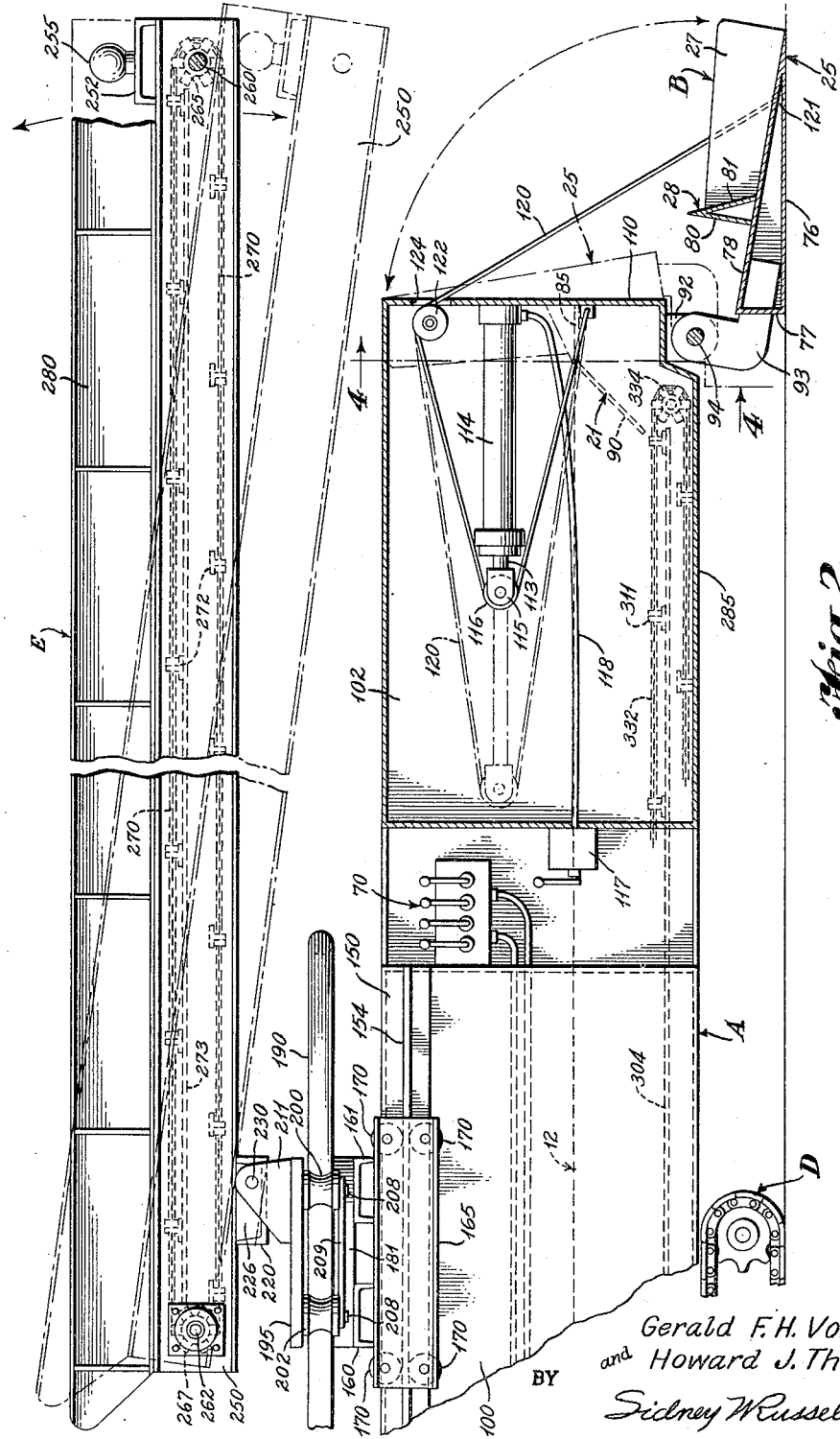

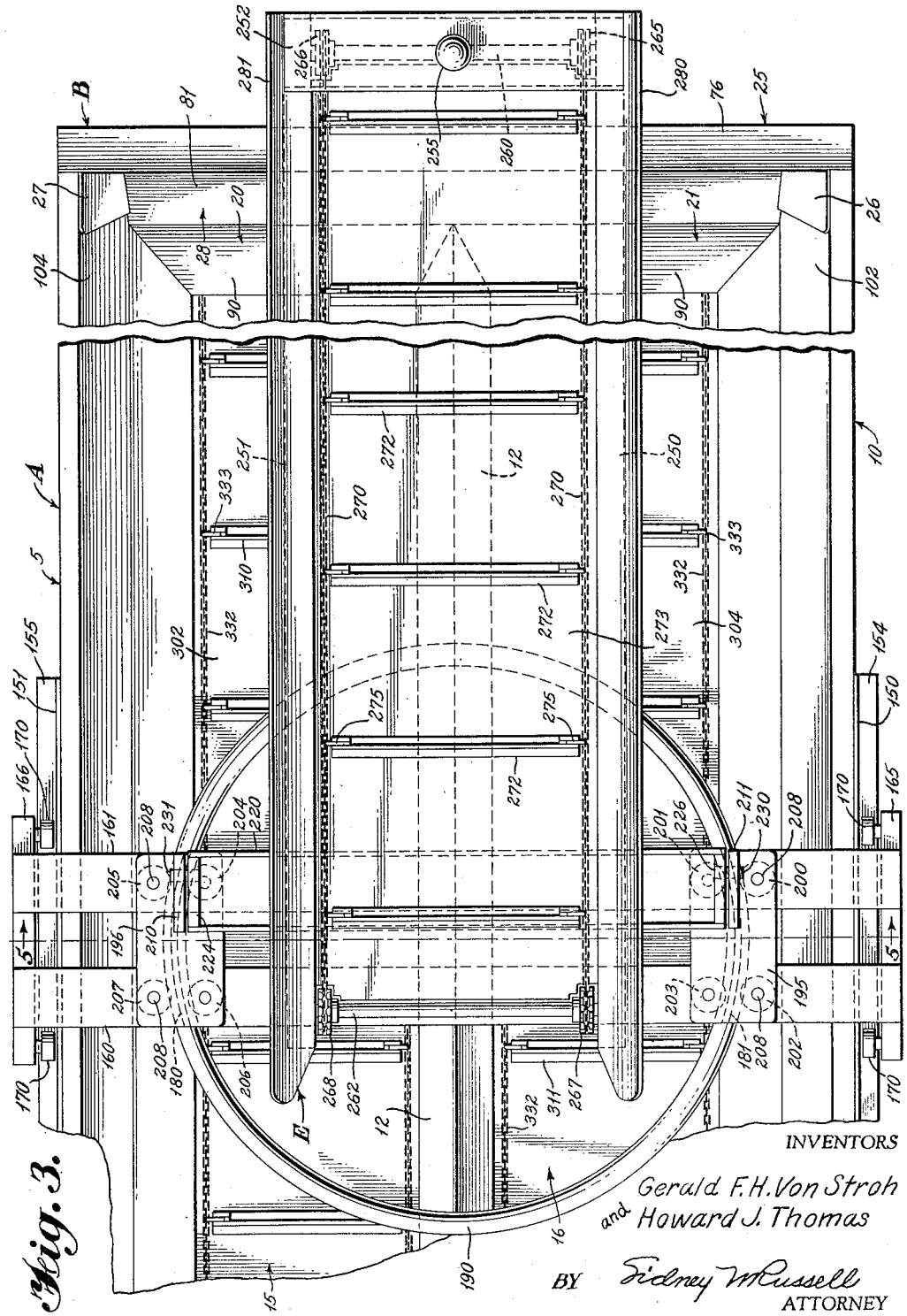

Sept 10, 1957 G. F. H. VON STROH ET AL 2,805,761
SURGE CAR APPARATUS
Filed July 21, 1955 11 Sheets-Sheet 4
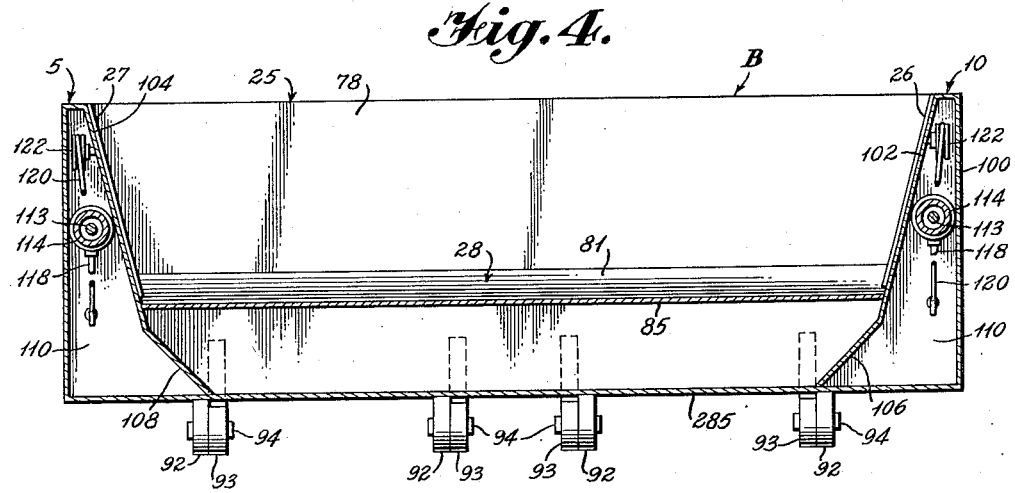
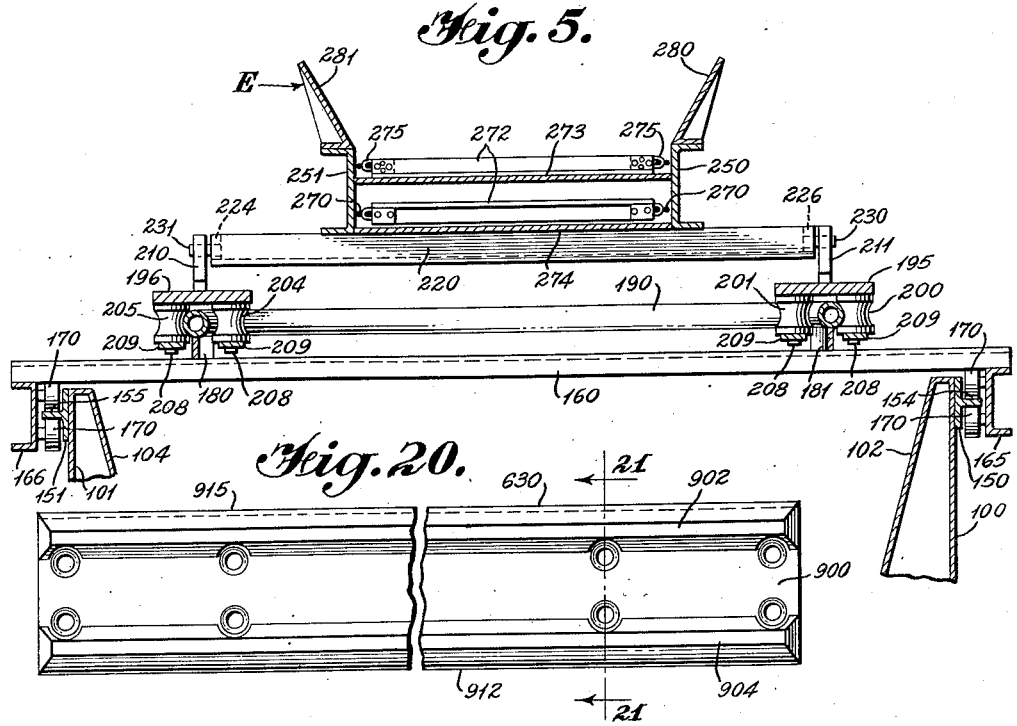
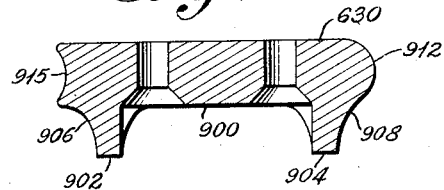
INVENTORS
Gerald F. H. Von Stroh
and Howard J. Thomas
BY Sidney W. Russell
ATTORNEY

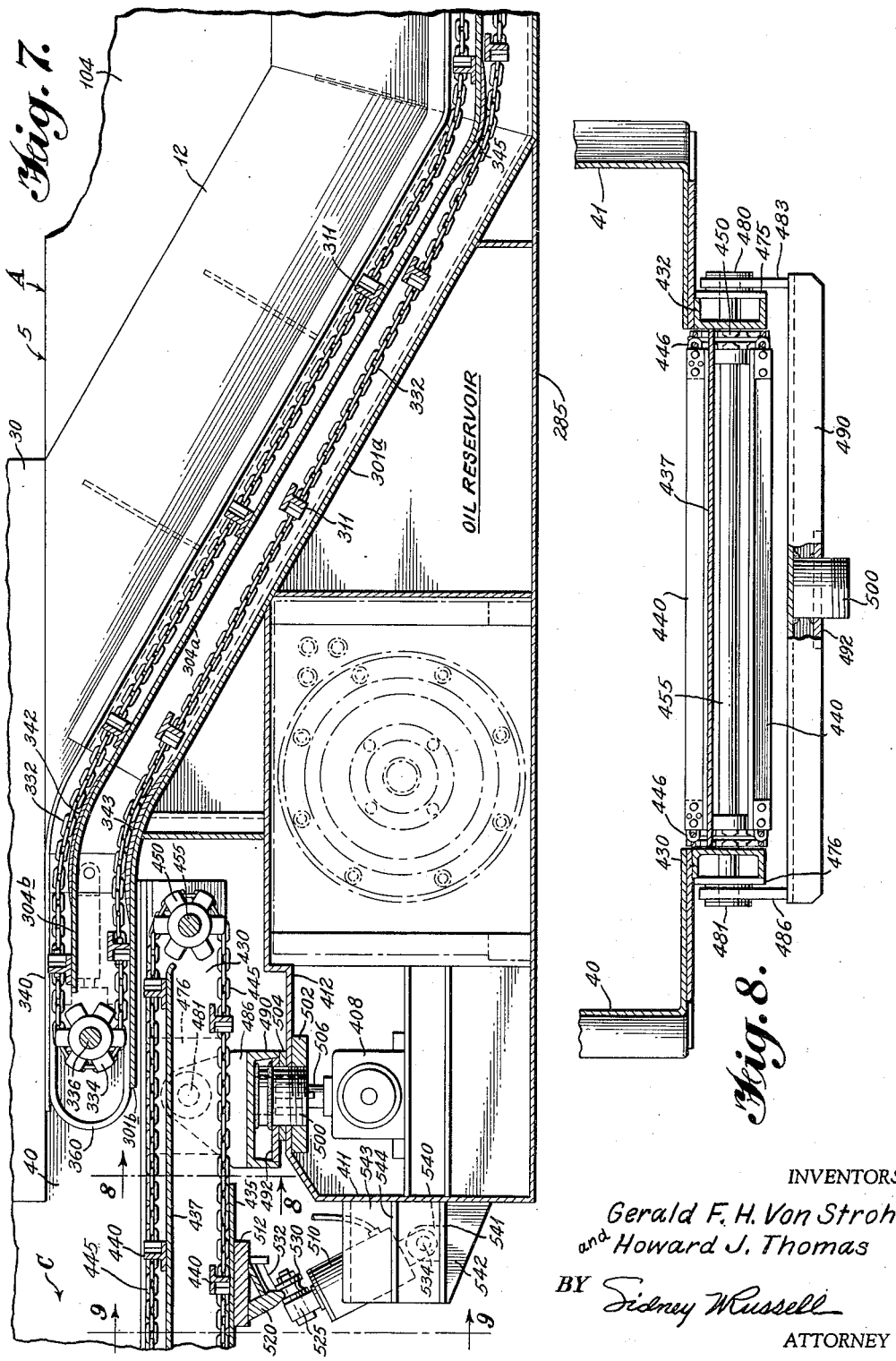

Sept 10, 1957   G. F. H. VON STROH ET AL   2,805,761
SURGE CAR APPARATUS
Filed July 21, 1955   11 Sheets-Sheet 7
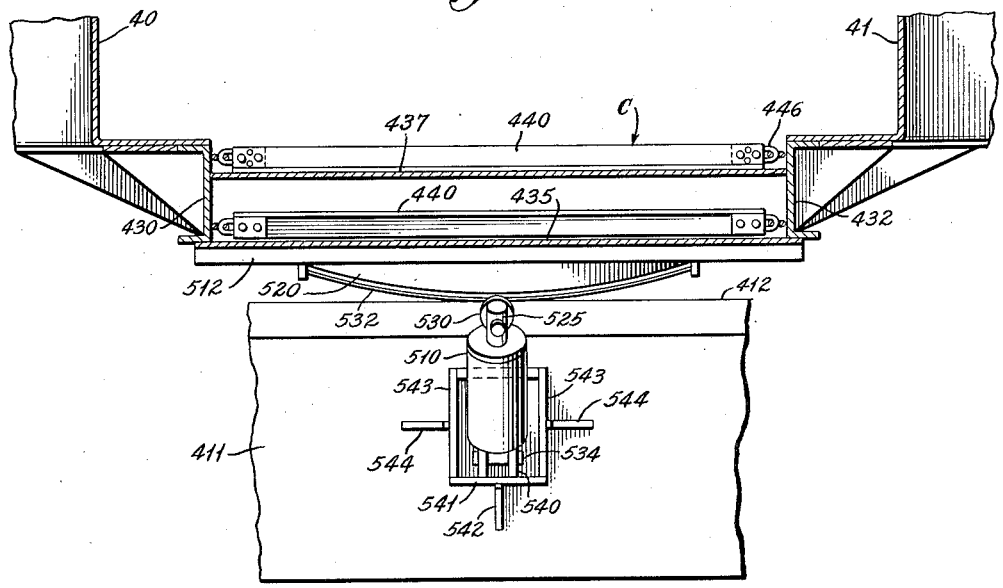
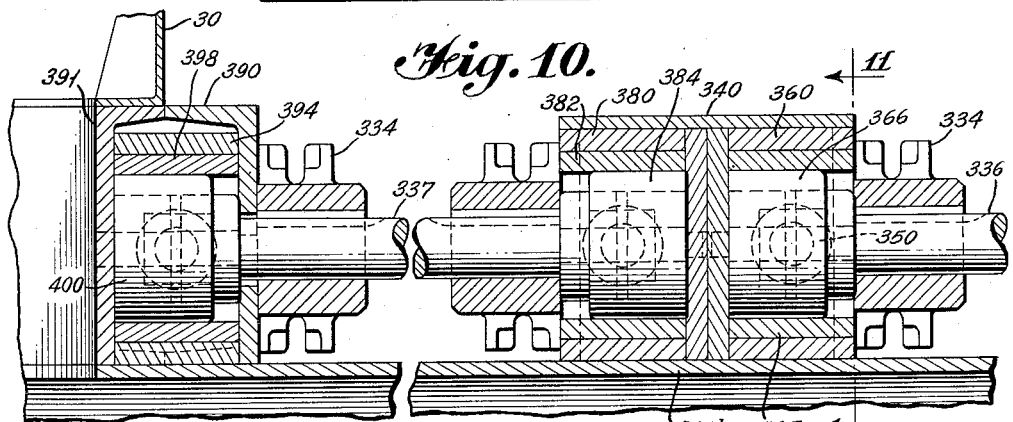
INVENTORS
Gerald F. H. Von Stroh
and Howard J. Thomas
BY
Sidney W. Russell
ATTORNEY

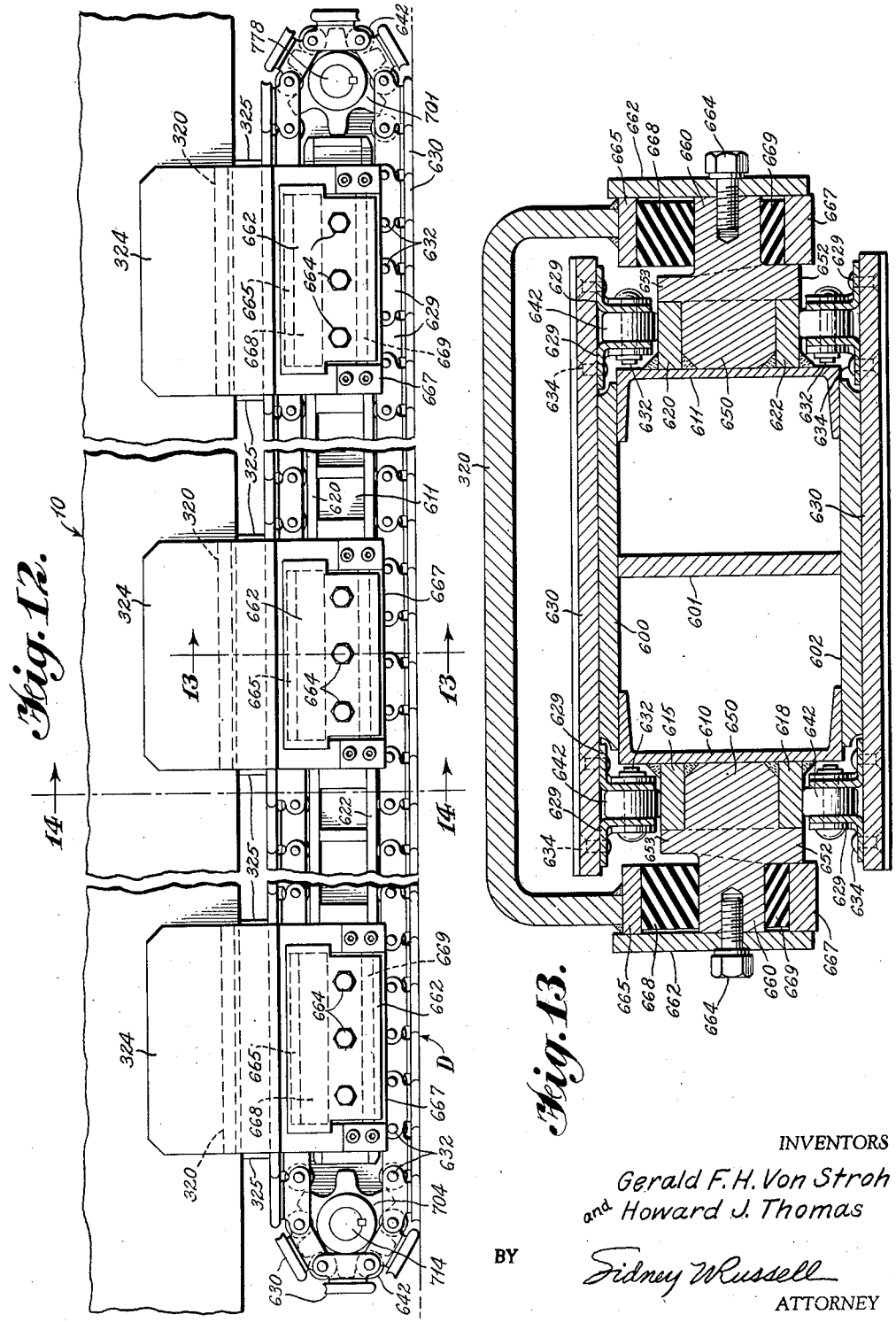

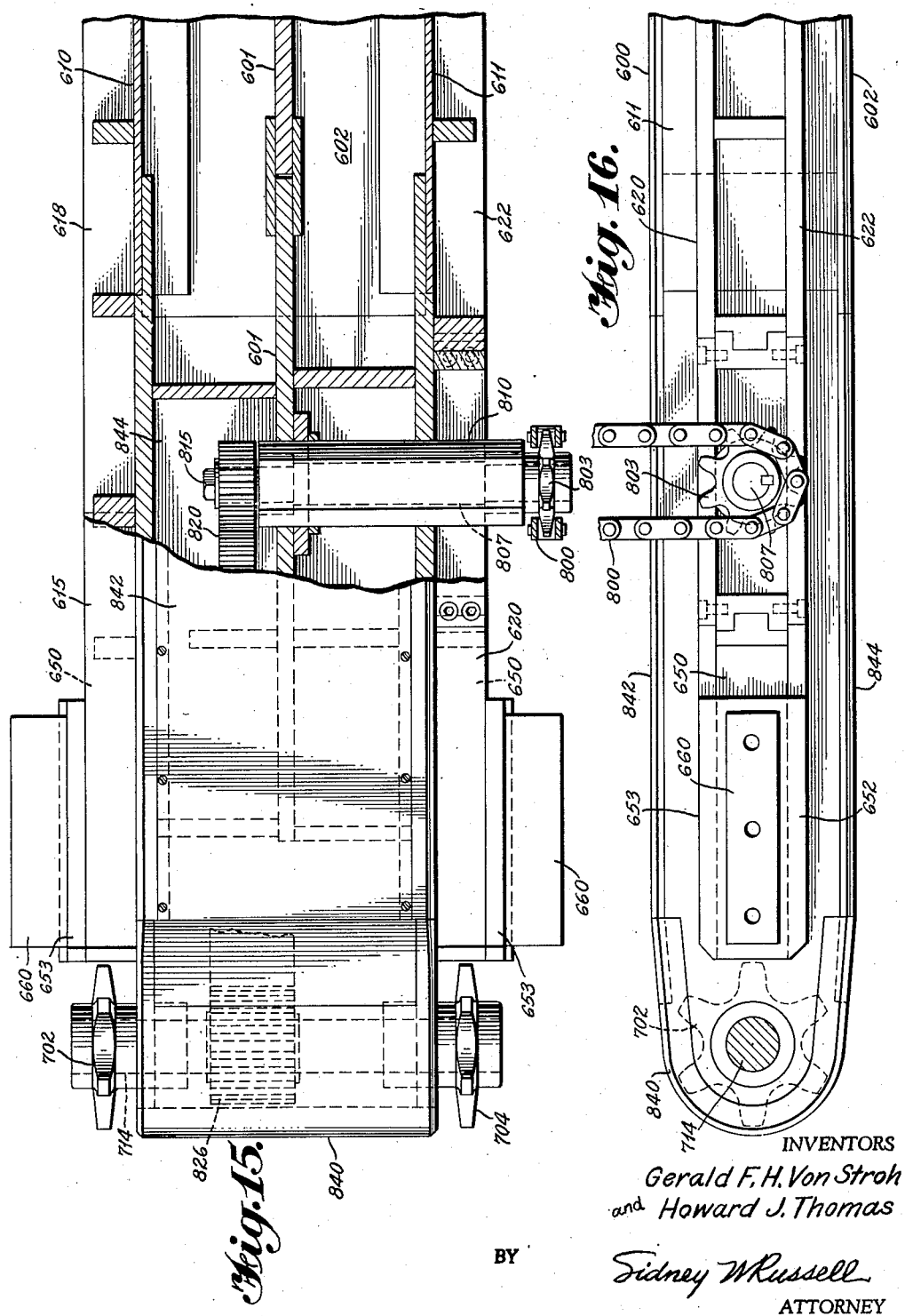

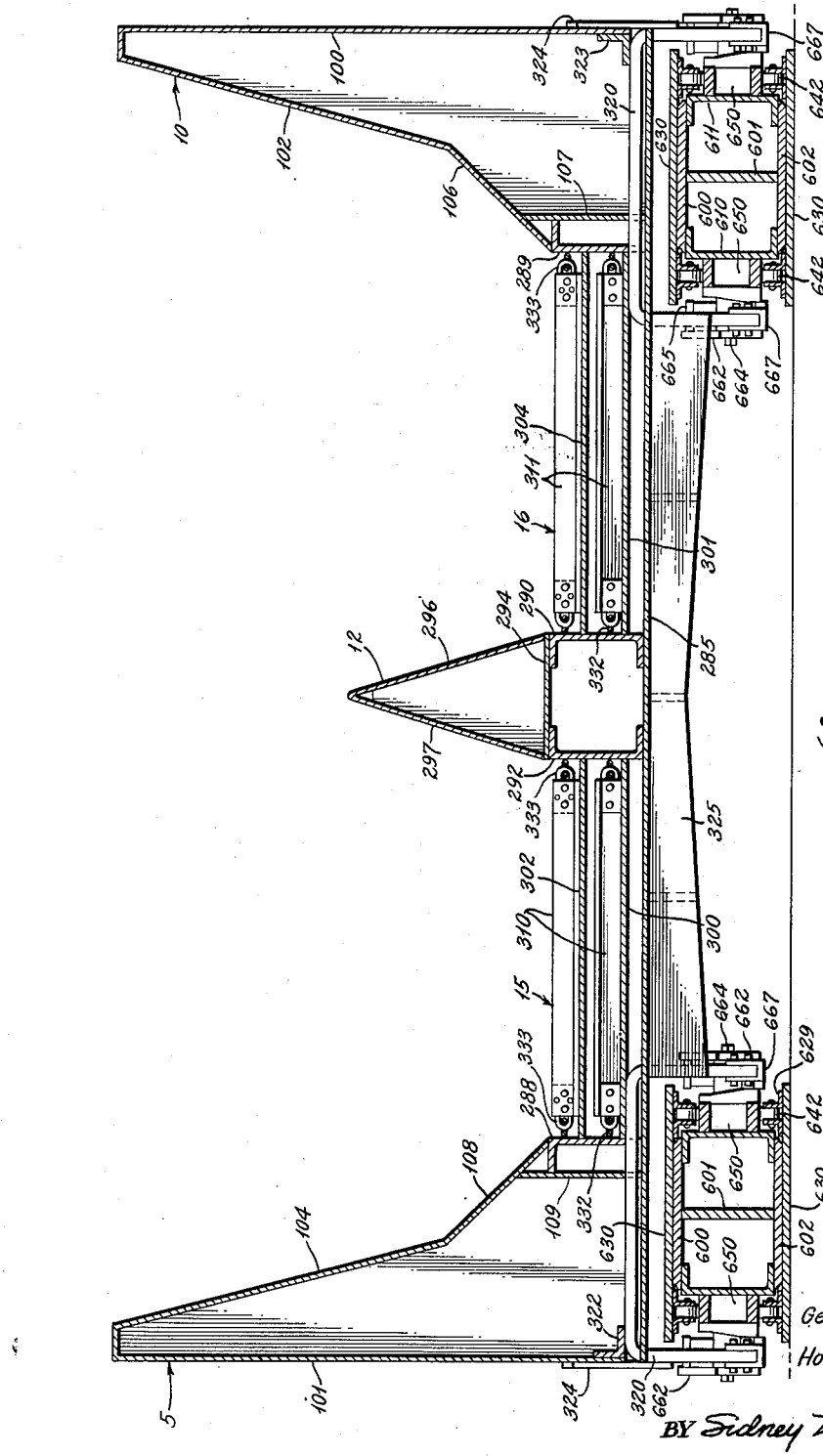

Sept 10, 1957 G. F. H. VON STROH ET AL 2,805,761
SURGE CAR APPARATUS
Filed July 21, 1955 11 Sheets-Sheet 11
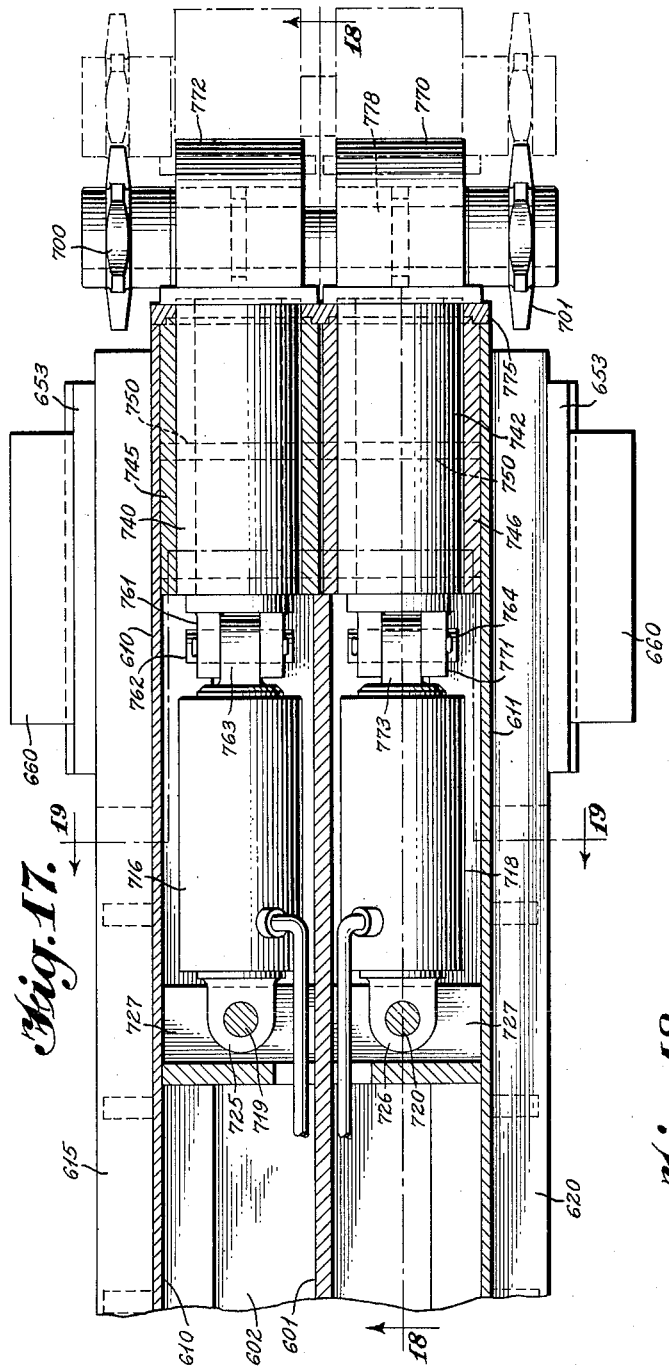
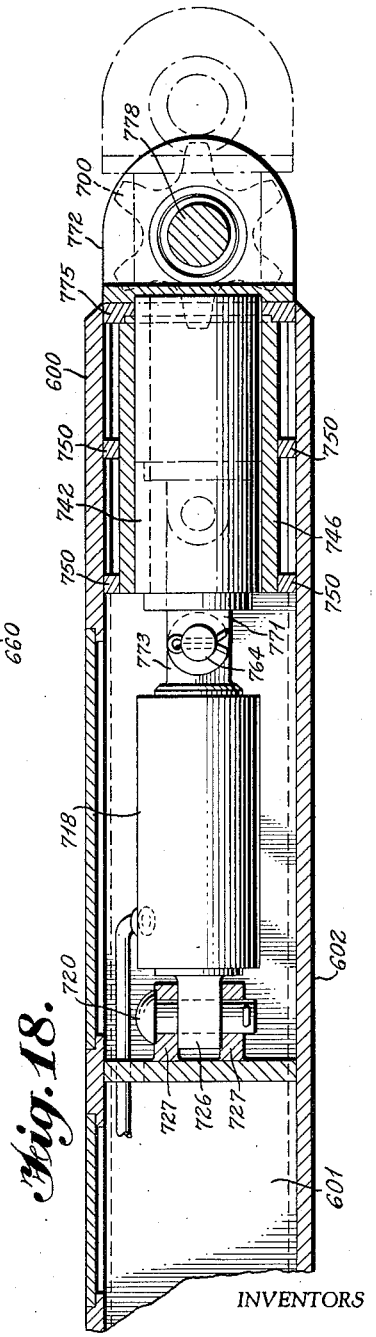
INVENTORS
Gerald F. H. Von Stroh
and Howard J. Thomas
BY
Sidney W. Russell
ATTORNEY

United States Patent Office 2,805,761
Patented Sept. 10, 1957

2,805,761

SURGE CAR APPARATUS

Gerald F. H. von Stroh and Howard J. Thomas, Huntington, W. Va., assignors to Bituminous Coal Research, Inc., Washington, D. C., a corporation of Delaware Application July 21, 1955, Serial No. 523,592

14 Claims. (Cl. 198—97)

This invention relates to conveyor and loading equipment for the transportation of mined materials, and more particularly, to a type of apparatus which we prefer to designate as a "surge car." The invention has particular usefulness in the coal mining industry where the relative size and flexibility of such equipment are factors of essential importance. The invention is also particularly adaptable for use with so-called continuous mining machines.

As a matter of background, it is to be observed that continuous mining machines of various types often deliver coal in pulsating or intermittent fashion. By this is meant that such machines may take a definite amount of time in penetrating the face sufficiently to cause ultimate breakdown or fracturing thereof, particularly with respect to coal seams. The rotary type of continuous miner is an example of a mining apparatus and system that achieves a somewhat intermittent or pulsating delivery of coal at the outby end. A rather brief explanation of the principle of mining by such rotary cutting mechanisms is found in the von Stroh Patent No. 2,657,916. Here, it is seen that mining is done with a rotor having rotor arms mounted on the axis of a burster. The objective of this combination is as follows: the burster and arms are directed at the face and, upon exertion of forward thrust, the burster will penetrate a given amount prior to actual breakdown or serration of the face much as described in this patent and as depicted in Figure 4 thereof. This may take but a relatively short period of time, but, during this time, no breakage of the coal occurs. Breakage or fracture does occur after the burster has penetrated a sufficient amount and the cutter bits on the rotor arm have also advanced a sufficient amount. At this point of penetration, collapse of the face occurs with consequent and relatively sudden discharge of coal through the usual conveyor equipment employed in conjunction with such mining mechanisms. Hence, the delivery at one moment is excessive and at another moment at a minimum, with the result that such delivery might be typified by defining it as "surging."

Although the foregoing has been specifically directed to the rotary type of continuous mining machine, the problem is present with other types of miners such as the chain cutting type, etc., certain of which have the same problem—accommodating the intermediate and periodic discharge of coal at the outby end of such miners.

Another definite problem, present by reason of the comparatively large output of continuous miners of the type mentioned, has to do with proper delivery to the usual shuttle haulage system which is often utilized for transfer of mined materials to the entrance. It will be appreciated that in shuttle haulage, such cars travel between the miner to the ultimate discharge point and, hence, at the outby end of the miner, there exists a discontinuity or intermittent manner of discharge necessitated by the shuttle car cycle to which reference has been made. Accordingly, at this outby end, it is necessary that substantial quantities of mined material be temporarily stored while the individual shuttle cars load and return. If temporary storage is not provided, considerable adjustments must either be made in the continuous miner itself or the latter must be temporarily shut down awaiting loading into the individual cars. However, even temporary shutdown of the comparatively large mechanisms which most continuous miners represent is, in the long run, expensive and naturally time-consuming. Accordingly, some form of storage must be provided that not only smooths out the so-called surging of the miner but also by adequately handling the relatively excessive and periodic output thereof can be made to intermittently discharge into individual shuttle cars as they appear unloaded and are ready for loading for another trip to the mouth.

With delivery of such continuous miners in the neighborhood of one to four tons per minute, the storage problem can thus become acute.

Hence, some provision must be made to level out the supply to either a conveyor system or shuttle haulage as to assure ultimate delivery of the production of such machines in a steady and controlled manner. Without such controlled output, it is readily apparent that the problems of conveyance of the mined material, and this is particularly true in the coal industry, are materially increased and become almost insurmountable if accommodation is not provided for a properly regulated delivery of the output.

It is apparent that the ordinary type of conveying apparatus, run at a standard or set speed and utilizing even a series of multiple conveyor means, presents no solution to the problems which have been stated in the foregoing. The control of speed alone in single conveyor units would be a most delicate operation requiring constant personal supervision. Even then, it is obvious that speed variation can not be the complete answer to the temporary storage problem. Speed variation would inflexibly result in, even at best, a material amount of intermittent delivery at the end of such a single conveyor system. It is seen, therefore, that the devices of the prior art have not propounded an adequate answer, in this aspect of mine transportation, to delivery of mined material from the so-called continuous type of mining machines which necessarily exhibit the inherent propensity of intermittent output. Nor can previous systems adequately deal with the acute storage problem which is ever present with machines of relatively large capacity that must necessarily feed into shuttle haulages requiring periodic deliveries.

It is, accordingly, a primary object of this invention to provide a surge car adequate to handle the variations in output in continuous mining machines of the described nature, such surge car having adequate means for temporary storage so as to accommodate fluctuations in output of the miner.

An additional object of the invention is to provide a surge car, having adequate storage facilities, which is adapted to intermittently deliver the required quantity of mined material to the individual units of a shuttle haulage system without necessitating shutdown or reduction in output of the machine itself.

It is a further objective of the invention to provide a surge car which, by reason of a twin, relatively slow moving conveyor system throughout the length thereof, has ample, temporary storage space for ore or coal as it is delivered by the miner and despite temporary and intermittent fluctuations in delivery from the continuous miner.

Another object is to provide such a surge car with a suitable type of bridge conveyor which is readily adjustable in both vertical and horizontal planes, and carried by the surge car as to be positioned longitudinally at any given point with respect to the car. Such bridge conveyor, having this aspect of variation in either direction, is adapted to interconnect with the outby end of whatever type of conveyor mechanism is used in continuous miners of the type herein referred to.

A further object of the invention is a completely adjustable tail boom conveyor at the outby end of the surge car. This is flexibly interconnected with the latter in such manner that although it too can be adjusted to various positions in both horizontal and vertical planes, it is able to receive material from the surge car without spillage and, by reason of its adjustability, can be positioned at the desired level or lateral angle for ultimate delivery of material to either the usual shuttle cars or to an additional conveyor system of, for example, the continuous belt type.

An additional object of the invention is to provide a surge car which is entirely self-propelled and which, therefore, can be easily turned in any desired direction to accommodate the location of the continuous miner, or follow the formation of the rooms within which this mechanism is placed.

Another object of the invention is the provision a conveyor mechanism of the type herein referred to which represents an extreme in overall height. This can be appreciated as important, particularly in the coal industry, where it is well known that vast amounts of coal are present in seams of comparatively low height. To this end, the mechanism has been designed to penetrate and be maneuverable with respect to rooms of extremely low overhead.

Another object of the instant invention is the provision of means to control the surge car from either end thereof and from either side. This is of great advantage to the operator who can, from almost any position with respect to this conveyor system, advance it, retract it, or turn it within comparatively small limits.

As another object of the invention, we provide a new type of tractor tread for the surge car. These are self-cleaning and so interfitted as to prevent a smooth and relatively large surface area to the floor, hence increasing the tractive power thereof.

An object of the invention consistent with the concept of reduction in height of this device is the provision of a tractor means and drive therefor that is not only the extreme in simplicity and ease of manufacture, but, more important, is extremely compact so that it does not materially increase the overall height of the conveyor itself.

With such objectives in view, as well as other advantages and objects which will be apparent to those skilled in the art, our invention will now be described in more particular with reference to the following drawings, wherein like numerals refer to like component parts, and wherein:

Figure 1 is a perspective view of the surge car with the bridge conveyor omitted;

Figure 2 is a side elevation view (partially in section) of the inby end of the surge car showing the bridge conveyor and clean-up scoop;

Figure 3 is a top plan view of Figure 2 with the clean-up scoop shown in closed, or raised, position;

Figure 4 is a section view along line 4—4 of Figure 2 with the scoop in closed position;

Figure 5 is a vertical transverse section through the bridge conveyor taken along the line 5—5 of Figure 3;

Figure 6 is a top plan view of the outby end of the surge car and boom conveyor;

Figure 7 is a vertical longitudinal section along the line 7—7 of Figure 6;

Figure 8 is a transverse section of the boom conveyor taken along the line 8—8 of Figure 7;

Figure 9 is a transverse section of the boom conveyor taken along the line 9—9 of Figure 7 and showing the boom conveyor elevating cylinder and curved track.

Figure 10 is a section through the outby end bearing brackets taken along line 10—10 of Figure 11;

Figure 11 is a section view along line 11—11 of Figure 10 showing chain sprocket bearing take-up cylinder;

Figure 12 is a fragmentary side elevation view of the caterpillar tractor section;

Figure 13 is a section view through one tractor tread and supporting yoke (removed from surge car) taken along line 13—13 of Figure 12;

Figure 14 is a vertical transverse section through the surge car and tractor treads taken along line 14—14 of Figure 12;

Figure 15 is a top plan view of power transmission end of one tractor tread;

Figure 16 is a side elevation view of Figure 15;

Figure 17 is a top plan view (partially in section) of take-up end of one tractor tread;

Figure 18 is a longitudinal section view along line 18—18 of Figure 17;

Figure 19 is a vertical transverse section view along line 19—19 of Figure 17;

Figure 20 is a plan view of the traction side of one tractor tread shoe; and

Figure 21 is a section view along 21—21 of Figure 20.

Referring to these drawings, it is seen that the overall mechanism is shown in perspective in Figure 1, with the exception of the bridge conveyor, depicted in Figure 2.

As shown in Figure 1, it is to be observed that this invention essentially comprises several different elements which, by their coaction, produce the objectives stated above. Thus, the main body of the surge car, containing a twin conveyor unit and being relatively large in capacity, is generally indicated at A. What we prefer to refer to as a clean-up scoop is located at the inby end of the car and is generally indicated at B. At its opposite end, a tail boom mechanism C is mounted on the surge car A in a manner to be adjustable in both vertical and horizontal planes. The entire mechanism thus far referred to is supported upon tractor mechanism D which, especially with respect to the drive means therefor, is most compact and extremely low in height. Cooperating with the surge car A in its various loading and conveying functions, and as shown in Figure 2, is a bridge conveyor E that can be moved upon, and from end to end of, the surge car to any desired position. Such bridge conveyor can also be vertically and horizontally adjusted to any desired position for interconnection with the tail boom of a known type of continuous miner; it is thus swivelly mounted for all practical purposes, and can be angularly positioned in any direction within broad limits.

It is seen that the main body of the surge car, forming a substantial storage compartment for the conveyed materials, is provided with two side walls, generally indicated at 5 and 10, respectively. Between these is a dividing wall 12, of an inverted V shape. As shown, such wall 12 is approximately half the height of the side walls. This provides two separated compartments, or conveyor receiving channels, for the reception of two endless type chain and flight assemblies 15 and 16. At the forward or inby end, these conveyors are surmounted by two upwardly inclined plates 20 and 21 which cooperate with the pick-up apparatus A in such manner as to conveniently receive material discharged therefrom when the scoop is raised to an upright position as shown in Figure 4. The scoop itself, generally shown at 25, has a shelf 28 vertically positioned across its center portion. Such shelf 28, mounted inwardly of scoop 25, ends in two angular portions 26, 27. The latter are so angled, as will later appear, as to precisely fit into the two side walls 5 and 10, thus closing off completely the forward end of the car when the clean-up scoop is lifted to an upright position as indicated at the dotted line in Figure 2.

The outby end of the surge car is provided with side plates 30, 31 which materially aid in directing the conveyor material to the tail boom conveyor C. The latter also has two material retaining side walls 32, 35, which engage the referred to plates so as to properly channel the conveyed material rearwardly. All four of the referred to side walls are aided in this operation of material direction by additional pivoted plates 40, 41 which, through the use of an appropriate type of spring means, to be later described, are continuously urged inwardly against the plates 30, 31 in closed position no matter in what direction the tail boom conveyor C is tilted vertically or pivoted laterally.

The entire mechanism is suitably powered by hydraulic motors, appropriately located for convenient transmission to the several moving elements. For example, hydraulic motors 50, 51 are located adjacent the ends of the shaft which drives the conveyor assembly in the tail boom. Similar hydraulic motors, likewise mounted at the drive shaft ends, provide power for driving both the bridge conveyor unit and the twin conveyors which are positioned within the surge car.

In the preferred and commercial embodiment of this invention, the surge car has a length of approximately 24' and a material capacity of approximately 12 tons. Yet the overall height of the apparatus may not exceed 42", including the height added by the bridge conveyor which, by reason of the structure herein described, can be compacted into an overall height of less than 18 inches.

These, broadly, constitute the main and integrated elements comprising our invention. In the interests of clarity, they will now be referred to in more detail under separate headings where each part of this apparatus will be described, commencing with the inby or forward end of this type of conveyor mechanism.

The clean-up scoop construction

As indicated in the foregoing, the inby end of the surge car is fitted with a clean-up scoop, highly useful in picking up and discharging into the twin conveyor system miscellaneous materials on the room floor. This is simply done by utilizing the tractor mechanism of the surge car as a trammer to force the scoop over the floor until loaded; subsequent lifting of the scoop propels the material thereon into the car, at the same time closing the forward end of the car. The scoop, designed to withstand considerable loads, may also be employed in like manner, by proper adjustment of its position relative to the horizontal, to level out rolls or sags in the room floor.

Referring to Figure 2, it is seen that the scoop 25 is actually of hollow construction having one plate 76 that is positioned at right angles to its base 77 with plate 78 completing a triangle representative of its cross sectional configuration.

As shown in dotted line in this figure, when the scoop is in raised position the inside plate 78 fits flush against the end wall 110 of the surge car. Such end wall 110 is fitted interiorly of the car with a horizontal, inwardly extending, shelf or plate 85 which, towards its terminal end, extends downwardly near the twin conveyors forming a flange 90 that terminates immediately above each of the conveyor units 15 and 16.

To further facilitate discharge of material picked up by the scoop 25, the latter is fitted across its mid-section with the transverse shelf 28, hereinbefore described. Such shelf is also triangular in configuration, being made up of the two converging sides 80 and 81. The result, when the scoop is in closed or dotted line position as shown in Figure 2, is to position the side 80 of the shelf flush against the plate 85, with the opposite side 81 then being slanted downwardly to further facilitate discharge of the scooped up materials into the surge car.

As hereinbefore indicated, the scoop also is provided with two extensions 26 and 27 on its interior face which are angularly inclined to the shelf 28 in such fashion that when the scoop is in closed position these extensions precisely fit against the inner side walls 102 and 104 of the surge car, as will be seen by reference to Figure 4.

The scoop is pivoted for rotational movement in a vertical plane. To this end, a series of pivot supports 90 are secured to the underbody of the surge car at its inby end as seen in Figures 2 and 4. These pivot supports, in turn, permit a series of pivot pins 94 to be journaled therein. A number of right-angular arms 92 are also secured to one wall 78 of the scoop as by welding or other suitable means, there being four of such arms in this preferred embodiment of the invention. These arms are each apertured to receive several pivot pins 94 and are keyed thereto or otherwise secured to the pins in such manner as they may easily rotate thereon. The configuration of the several arms 92 is necessarily right-angular in order that the scoop itself when pivoted upwardly to closed position will, as stated, lay flush against the end wall of the surge car in the manner indicated in Figure 2.

Suitable hydraulic means for lifting the scoop are also provided. The means to be described, shown in Figure 2, are duplicated on the opposite side of the mechanism as will be seen by reference to Figure 4. Thus, such means are located between walls 100 and 102 on one side of the surge car and between walls 101 and 104 on the other side. In any event, this discussion, having reference to only one of the operating mechanisms, will be understood to apply to both. Such includes a hydraulic cylinder 114 secured at one end to end wall 110 and positioned inwardly parallel to the surge car bottom. It is fitted with a yoke 115 on the end of its piston rod 113, the yoke accommodating in rotatable fashion a sheave 116 which is suitably journaled therein. The hydraulic cylinder is adapted, through the sheave, to carry inwardly, or take-up on a wire rope 120 suitably affixed at one end to the top portion of the scoop as at 121. Such wire rope is also positioned across another sheave 122 located within the framework of the side wall 10 of the surge car and leads, in each instance, through an appropriate aperture 124 formed in end wall 110.

A suitable control for the cylinder is indicated at 117. This may be of the usual four-way valve type and is connected by suitable hydraulic lines 118 to the cylinder proper. Actuation of the cylinder to extend the piston rod thereof results, of course, in the pivoting upwardly or closing of the tailgate or clean-up scoop. It is indicated in closed position by dotted line in Figure 2, and shown in the same position in Figure 4.

Since this entire surge car mechanism is self-propelled, it will be appreciated that the scoop construction provides a means for scraping together loose materials on the room floor and lifting them into the twin-conveyor unit in a simple and easily controlled operation. When closed, the scoop, as is obvious, provides a retaining end wall to the surge car, preventing discharge of material conveyed to the surge car during the ordinary delivery of mined materials from the face to the ordinary shuttle car transportation system. The surge car being a self-propelled vehicle, the scoop assembly is also useful in smoothing out rolls or sags in the room floor. In operating as such, the surge car can perform much in the manner of a bulldozer—having the additional function of transporting to the loading point the material so removed.

The bridge conveyor

This unit, constituting part E of the combination of elements referred to above, is, as stated, adjustable in both vertical and lateral planes. It is also so made as to ride upon the surge car and traverse its length at the will of the operator. Such function permits materials from the continuous miner to be constantly discharged at any desired point throughout the length of the comparatively large storage space provided by the surge car.

The bridge conveyor rides upon rails 150 and 151 located on opposite sides of the car. These rails are in the form of T angle irons secured, as shown in Figure 5, against the outside walls 100 and 101, respectively, so that one edge extends outwardly, the edges 154 and 155 actually constituting the two side rails supporting the bridge conveyor. The bridge conveyor itself rests upon a platform or frame comprised of two lengths of channel iron 160 and 161, the latter, in turn, being welded across or otherwise suitably affixed to the longitudinal channel iron pieces 166 and 167. Each of these frame members 166 and 167 is provided with a pair of small wheels 170 at each end thereof and such wheels, as can be appreciated by reference to Figures 2 and 3, are oppositely positioned on the rails 154 and 155. When thusly placed, with the rails in between each pair of wheels 170, and secured to the bridge conveyor in a manner which will be described, it is clear that the conveyor is positioned on the surge car so that despite subjection to considerable overload, it will not be displaced from the rails upon which it rides, the members 160 and 161 maintaining such wheels and their supporting frames in the manner shown.

The entire bridge conveyor construction, as stated, is also pivoted for rotary movement in a horizontal plane and this is accomplished by having its base ride upon a circular track or ring 190. Such ring is supported by the two channel iron pieces 160 and 161 to which reference has been made, there being an interconnecting link welded to the pieces 160 and 161 on the one hand to the opposed sides of the ring 190 on the other. Upright members or welded links 180 and 181 so connecting the ring and the transverse channel iron members 160 and 161 are shown in Figures 2 and 3. When secured in the fashion described, it becomes clear that the ring, now mounted for longitudinal movement along the line of the surge car, is comparatively rigid against vertical variation to any degree.

A mechanism which interconnects the bridge conveyor with the ring 190 is found in a wheeled structure that utilizes the ring as a track upon which to rotate. Such structure includes plates 195 and 196 each of which is provided with two pairs of rollers. Thus, plate 195 has a pair of rollers 200, 201 at its forward end and a pair of rollers 202, 203 at the rear thereof. Similarly, the rollers 204, 205 and 206, 207 are located in like manner on plate 196. Each of the rollers are also grooved or of concave shape about the respective peripheries thereof, such shape approximating the shape of the round surface of the ring 190. It is to be noted that the spacing between each pair of rollers is such as to have the opposed rollers embrace opposite sides of the ring 190 rather snugly, with sufficient tolerance, however, to permit free movement thereof. These rollers are each journaled on an appropriate axis, as that indicated at 207, with spacers 209 connecting the several axes 207 of the pairs of rollers on each side of the ring 190.

Each of the plates 195, 196 is also fabricated with a vertical pivot support such as those shown at 210 and 211. An additional transverse channel iron 220 is fitted with two end plates 224 and 226 each of which is suitably apertured to receive pivot pins 230 and 231. These pins ride in additional apertures provided in the pivot plates 210 and 211. Thus, viewing Figures 2 and 3, it is seen that the transverse channel member 220 is pivoted for rotation in a vertical plane with respect to the surge car and it is shown angularly inclined in Figure 2, carrying with it the surmounting bridge conveyor (shown in dotted line) at a substantial angle to the horizontal.

The main body of the conveyor apparatus itself lies within two frame members 250 and 251 which also comprise channel iron elements with the webs thereof inwardly disposed. These channel elements are secured to the pivoted member which has been described, channel element 220, in any suitable manner.

At the base of the members 250, 251, a bed plate 274 is also provided, the latter providing a support or bed for the conveyor flight and chain assembly on its return cycle. Similarly, an additional plate 273, also secured between the two side elements 250 and 251 of the conveyor, constitutes an upper bed plate for support of the chain and flight assembly during its conveying cycle or, in viewing Figure 2, during the continuous movement of the upper flights from right to left. The chain and flight assembly is suitably driven about sprockets 256 and 266 which, at the inby end, are keyed to drive shaft 260. At the outby end of the conveyor, the flight assembly rides over sprockets 267 and 268 and these are suitably keyed to shaft 262. The flight chain 270 drives, in turn, a series of conveyor flights 272 which are of T formation and each of which, as by a connecting link 275, are interconnected with the drive chain 270.

Although not shown herein, it is understood that power for driving this flight and chain assembly is to be obtained from a hydraulic motor that is preferably located immediately adjacent the inby drive shaft 260 much in the same manner as the hydraulic motors 50, 51, shown in Figure 1, are designed to drive the conveyor system of the tail boom assembly.

This bridge conveyor also has the usual chute arrangement in the form of outwardly flared plates 280 and 281 which are welded to the upper flanges of the frame members 250 and 251, respectively. An interconnecting means is located at the inby end of the bridge conveyor. This comprises an additional transverse channel member 252, superimposed upon and joining frame members 250, 251. The center of this is fitted with a ball element 255. The latter is designed to engage a complementary socket, not shown, in the tail boom conveyor of known forms of continuous mining machines.

From the foregoing description, it will be understood that our invention provides a highly flexible, maneuverable and easily controlled bridge conveyor. Its flexibility resides in the manner by which, due to the foregoing construction, it can be transported the length of the surge car, turned laterally to any desired direction with respect to the car, and, at the same time, be inclined upwardly or downwardly to a substantial degree. This facilitates the delivery of temporary excess output of the continuous miner to any area within the storage space provided by the surge car. It also enables the intermittent delivery of certain types of continuous miners to be smoothly regulated. The result, as will be appreciated, is to materially aid in meeting the periodic demands of shuttle haulage, and to smooth out the delivery of mined materials to such a system with out temporary and expensive time lapses.

*The twin conveyor unit*

In order to achieve the advantages and objectives hereinbefore recited, we have not only provided a material-receiving car which serves the purpose of temporary storage space but further insures continuous and regulated delivery from the car by utilizing a twin conveyor system which is located therein.

Referring to Figure 14, the main body portion of the surge car is, as already described, positioned within the two side members 5 and 10. These consist of a number of separate plates forming separate hollow structures. Thus, side member 5 consists of an exterior vertical wall 101, an interior angularly inclined wall 104 and an additional inclined plate 108 that extends downwardly toward one of the adjacent conveyor assemblies. Similarly, side wall 10 is formed of the vertical side plate 100, an oppositely positioned and inclined plate 102 and an angular bottom member 106 immediately adjacent the other of the twin conveyor assemblies.

Such side wall structure, together with the remaining elements of the conveyor systems is mounted on a conveyor floor 285 extending across the entire width of the surge car.

The referred-to bed 285 provides support for two side frame members 288 and 289 extending longitudinally of the surge car. These members, which are of channel iron with the web side thereof facing inwardly, are additionally braced by braces 110, 111 which reinforce the slanting walls 106, 108 of the car as shown in Figure 14. They also accommodate the lower bed plates 300, 301 provided as support for the flights on the return cycle of the conveyor assembly. Plates 302, 304, similarly affixed to the aforesaid frame members, support the conveyor assemblies on their rearward or conveying cycle. Such respective conveyor beds, on the opposite sides, are affixed to a central supporting structure which, as herein shown, consists of opposed channel members 290, 292. The two conveyor assemblies are divided by the referred to partitioning member 12 which is actually in the form of an inverted V, the two sides thereof, 296, 297, assuming the shape of an isosceles triangle. The base 294 of such triangle, as shown, rests upon and is secured to the central supporting structure, the latter running substantially the entire length of the surge car.

This entire structure comprising the main frame of the car rides upon a tractor assembly which will later be more fully described. For present purposes, however, it is to be noted that this base assembly surmounts a series of yoke elements 320, the latter comprising a part of the tractor assembly and being mounted opposite each other on opposite sides of the surge car. At appropriate spaces these opposed yokes 320 are joined by transverse stiffeners 325, extending across the width of the car and providing additional support for the base plate 285 and the related structure which has been described in the foregoing.

These twin conveyors are of a type similar to the unit already described with respect to the bridge conveyor system. They consist of a series of flights 310 on the one hand and a duplicate series of flights 311 on the other.

Referring to Figure 7, it is seen that the two conveyor beds, at the outby end of the surge car, rise upwardly at a decided angle. The purpose of this is to provide sufficient space for the tail boom conveyor which, as shown in this figure, underlies the outby end of the twin conveyor units. Thus, for example, conveyor bed 304 is shown in Figure 7 at 304a and the return conveyor bed 301 is here shown as 301a, both of these plates being angularly inclined upwardly at an angle of approximately 30° to the horizontal. Both of these conveyor beds, at the terminal ends thereof, return to positions parallel to the base of the car, as indicated at 301b and 304b. The pivoted end of the boom conveyor is positioned thereunder.

The chain and flight assemblies are driven by drag link chain 332 which, in each instance, engage suitable sprockets 334 at the opposite ends of each conveyor system. The sprockets are keyed to individual shafts, such as those shown at 336, 337, in a common and well-understood manner. These sprockets, in each instance, are identical and the connecting links 333 which interconnect the individual flights to the drag link chain are of a type already referred to. At the portion where the two conveyor beds of each conveyor change inclination to a somewhat sharp degree, as described above, we have provided rubbing plates to absorb wear of the chain against the conveyor beds due to abrasive action across these relatively sharp corners. Hence, the upper bed is fitted with wear plate 342, the lower with wear plate 343 and a like protection against wear afforded by plate 345 near the base of the conveyor assembly.

The drive means for this twin conveyor unit is most conveniently located at the inby end of the surge car. Although not shown, it is to be understood that hydraulic motors of the type already referred to, such as motors 50, 51 used to drive the tail boom conveyor, can be similarly located near the drive shafts at the inby end of the surge car. In other words, such hydraulic motors, being comparatively small in size, can be positioned immediately adjacent the outboard ends of each of the drive shafts of these twin conveyors. The manner in which this would be done and the manner in which they would directly or through a gear reduction means be connected to such drive shafts is well within the skill of the art and forms no part of the instant invention.

Our invention with respect to the conveyor mechanism is unique in this additional respect—we have found that a hydraulic take-up apparatus forms a highly efficient means for maintaining tension on the various chain and flight assemblies of each twin conveyor unit. This take-up mechanism, shown in some detail in Figures 10 and 11, consists of a hydraulic cylinder 350 that, as indicated, is suitably pivoted to an adjacent frame member 351 by means of pivot 355.

Although only three take-up mechanisms are shown in Figure 10, it is to be understood that there are actually four—one on the outside of each of the rear sprockets which drive the twin conveyors. The purpose of such cylinders is to exert thrust against the respective axes upon which the several sprockets rotate, such cylinders being actuated in unison and each of them providing an equivalent amount of thrust. This is done in the following manner, reference being made first to the take-up mechanisms shown on the right in the referred to figure.

A suitable sliding mechanism is interconnected with the piston rod of the aforesaid cylinder 350, such sliding means, with reference to Figure 10, immediately underlying the cover plate 340. A U-shaped bearing block 360 is adapted to receive a sliding shoe 365 designed to reciprocate longitudinally and as required within the described U-shaped element 360. The shoe 365 is provided with a suitable bearing 366 in which the axis 337 is journaled. The sliding shoe is also fitted with a rearward projection or base 368 to which the piston 370 of the hydraulic cylinder 350 is pivoted in such a manner that reciprocation of the slide is accomplished in a manner not to bind the same.

Actuation of this cylinder 350 is obtained by admission thereto of hydraulic fluid through line 375. The usual type of hydraulic control, such as a common four-way valve of the kind generally used in a closed system, may be employed.

It is to be understood that the foregoing description of this take-up mechanism has been made with reference to but one of such means whereas four are actually employed. Such description thus far refers to the take-up means located adjacent sprocket 334 (Figure 10). In any event, the other three take-up means are largely the same and operate in unison with that just described in order that the axes or shafts 336 and 337 are constantly thrust rearwardly with the same, predetermined amount of force, thus creating tension on the flight conveyor system in an even and constant manner.

It is to be appreciated that the take-up means adjacent sprocket 336 also employs a U-shaped member 380 which is here shown as accommodating an identical sort of sliding shoe 382. The bearing 384 is mounted in such shoe. The hydraulic cylinder and its interconnecting mechanism with the shoe is the same as that already described.

Viewing Figure 10, the remaining take-up mechanism or that one seen on the left side is the same in all respects as the take-up mechanism which has not been shown or the one adjacent to the outboard sprocket on shaft 336. In this instance, two L-beams 390, 391 are joined together with the web outwardly, as shown in this figure. A comparable U-shaped member 394 is affixed in position between these two L beams, the latter structure accommodating the same form of slide 398. The shaft 337 is journaled in bearing 400 and this bearing, affixed to the said slide 398, is permitted to reciprocate longitudinally responsive to the thrusting movement of the cylinder adapted to move this particular slide. Here, again, the remaining mechanism of the take-up means is largely identical to that already described with respect to the take-up mechanism used in conjunction with each of the other sprockets.

The common form of take-up mechanism in related types of devices generally performs its functions on the principle of thrust of helical springs under tension or compression. These must be constantly adjusted manually with respect to such forces; if not, the thrust employed to tighten or take up the slack in such mechanism as a conveyor system either fails to achieve this purpose or exerts thrust to such an untoward extent that excessive wear or binding of the mechanism results. In this particular structure, however, we have found that by employing a hydraulic system or separate hydraulic cylinders to evenly apply a predetermined amount of fluid pressure across the lateral extent of the axis on which the several sprockets are mounted, a constant, even and proper amount of thrust resulting in an efficient, durable take-up is available. To this end, we have further found that 100 pounds per square inch of fluid pressure is the preferred amount to employ in operation of these take-up mechanisms. This is easily controlled by suitable bleed-off valves from the main source of fluid supply or by the use of a known type of hydraulic fluid pump which can be calibrated to evenly and constantly deliver fluid pressure at this rate. Such a system, once set to the desired amount of thrust, applies rearward pressure (towards the outby end of the unit) at a constant and even rate in such manner that wear is automatically compensated for and in such a way that there may be complete assurance that excessive thrust, effectuating inordinate wear, does not result.

Although not herein shown, it is to be understood that this type of take-up mechanism can also be employed with respect to the chain and flight conveyor system heretofore described with respect to the bridge conveyor.

The outby adjustable boom conveyor

As indicated in the foregoing, the inby end of the tail boom conveyor is located immediately underneath the upwardly extending portions of the two twin conveyors in order that the latter can effectively discharge mined material into the boom conveyor without possibility of spillage.

The two side plates 40, 41, described in conjunction with Figure 1 of the drawings, are pivoted so that they extend between the tail boom conveyor and the fixed plates 30, 31 on the surge car. Plates 40, 41 are held in constant contact with the latter no matter to what degree of lateral inclination the boom conveyor is turned. Mechanism to achieve this result is found in two leaf springs 420, 422. One end of each of these is secured, as by welding, to the side plates 32, 35 of the boom conveyor; the opposite end of the bottom leaf of these springs being turned outwardly for sliding contact with plates 40, 41. The spring means are also constantly urged inwardly to the desired degree by pins 425, 428 immediately adjacent each of such leaf springs and bearing against the outer sides thereof. Pins 425, 428 are supported in two housings 415, 418, respectively, both of the latter being secured to the outside of guide plates 32, 35. The side plates 40, 41 are pivoted by hinges 423, 424 to the trough structure on each side of the boom conveyor mechanism as clearly shown in Figure 6. Thus, with the leaf springs constantly pressing against the sides of the two guide plates 40, 41, it is seen that as the boom conveyor is turned such plates also angle to the desired degree, retaining, however, their close surface to surface contact with the main frame of the surge car. This structure prevents spillage during the delivery of conveyed materials from the twin units of the boom conveyor when the boom conveyor is turned to one side by maintaining the trough side walls continuous and unbroken.

The operative elements of the conveyor mechanism of the boom conveyor are supported by a main frame consisting of two channel plates 430 and 432 (Figure 9), both affixed, as there shown, upon a base plate 435. This bed 435 supports the drag bars 440 upon their return travel backwardly towards the inby end of the system. A similar plate 437 extending between these two side frame members supports the drag bars during their rearward or conveying movement.

The usual sort of drag link chain 445 is employed to impel the drag bars in the usual manner, such being interconnected with the conveyor flights through links 446. The drag link chain is carried upon pairs of sprockets 450 located as indicated in Figure 6 at the respective extremities of the boom conveyor. Such sprockets are mounted at the forward end of this mechanism upon shaft 455 and at the rear thereof upon shaft 456, such shafts being journaled in the side frame members 430 and 432 in a well understood manner.

It is to be noted that the described flight and drag link chain assemblies of the boom conveyor are approximately one-third again as wide as the individual conveyors of the twin unit. Such substantially greater width is adapted to more readily accommodate the material discharged from such twin conveyors. Also, in the preferred operation of the surge car, the boom conveyor is adapted to be driven at a rate 50% greater in feet per minute than the rate of travel of the twin conveyors located in the main coal chassis of the car.

Reference will now be made to the mechanism by which the tail boom and apparatus movable therewith can be pivoted downwardly or moved laterally to the right or left. The pivot mountings at the forward or inby end of the tail boom permit travel in both of these directions. The two side plates 475, 476 are secured across the web and at one end of each of the frame members 430, 432, as shown in Figure 8. These plates are, in turn, provided with an extended bushing or pivot such as those indicated at 480, 481, each of which is flanged upon its ends in such a manner as to retain the tail boom in its pivot mounting. The pivots 480, 481 are journaled in suitable apertures provided on pivot supports 483, 486. Such supports are welded or otherwise secured to a transverse inverted channel beam 490 (Figure 8). It is readily apparent that with the pivoted structure thus far described, provision has been made for elevation or depression of the side beams 430, 432 and, consequently, like movement of the tail boom apparatus that is mounted thereon.

Lateral deflection is permitted by an additional mounting secured to the center of the channel beam 490 (Figures 7 and 8). Such beam is provided with an additional web 492 across its center portion. This is welded to a round shaft or pipe formation 500, the upper end of the latter being also welded to the web of channel beam 490. Such shaft or pivot member 500 is threaded at its lower end so that it may be secured in known fashion to a retaining flange 502. This, in conjunction with the plate or flange 504 located on the opposite side of wall 412, permits the entire tail boom structure to pivot, utilizing the round element 500 as the pivot point. It is to be understood that an anti-friction bearing assembly may be substituted for plate 504, thus further assuring ease of movement of the tail boom assembly to right or left.

The pivot pin 500 is keyed or otherwise secured to an extension 506 that is suitably interconnected with a servo motor 408 or other hydraulic and geared power supply suitable for rotation of the tail boom laterally.

Elevation and lowering of the tail boom is accomplished by extension and retraction of a hydraulic cylinder 510. This is in pivoted interconnection at one end with side wall 411 of the main frame of the surge car. Thrust of this cylinder is exerted against the under side of the tail boom at a point to the rear of the pivot construction which has just been described. A cross plate 512 joins the frame members 430, 432 of the frame for the boom conveyor at a point which is approximately one-fourth of the distance from the inby end thereof. This transverse plate has secured to its under side a curved element 520. This element has a rounded edge or rail 532. Such rail is representative of a compound curve. In other words, it forms an arc in a horizontal plane which extends throughout substantially the width of the boom conveyor as shown in dotted line in Figure 6. On the other hand, this rail is also formed with a curve which lies in a series of vertical planes and which can be appreciated from observance of the rail in Figure 9. The purpose of this structure representing such a compound curve is to maintain the boom conveyor at a predetermined distance above ground level, yet permit that boom conveyor to be angled laterally from side to side with respect to the surge car without alteration of that vertical height. It will thus be understood that if the so-called vertical curve or arc of the rail 532 does not approximate that shown in Figure 9, or, in contrast, lies entirely within a horizontal plane, when the boom is pivoted to right or left, there will be a resultant alteration in the height thereof above the floor.

The referred-to cylinder, having the usual piston 525, is adapted to exert thrust against this curved rail or to support the rail in any predetermined position, such position being dependent upon the amount the piston of the cylinder is extended. To this end, the piston rod is fitted with a grooved wheel 530 similar to the ordinary type of pulley wheel or sheave but grooved to conform within reasonable tolerance to the external shape of rail 532.

The cylinder 510 turns on a pivot pin 534 which is mounted in a yoke 540'. It may thus move forwardly or rearwardly about the pivot point so as to accommodate for the conditions arising as a result of the raising or lowering of the tail boom. The frame 540 which supports the lower end of the cylinder is, however, of such construction as to resist any appreciable amount of lateral deflection of the cylinder. Ordinarily, this will not occur due to the fact that the wheel 530, during lateral movement of the tail boom, can readily traverse the distance from one end of the rail 532 to the other without causing lateral movement of the cylinder.

The yoke 540 which supports the pivot pin for hydraulic cylinder 510 is mounted upon a horizontal plate 541 comprising a base which is, in turn, rigidly maintained in position by a vertical brace 542. Actually, this cylinder, as a protective measure, is housed in a box formation, the sides 543 and the additional lateral braces 544 all being secured in an appropriate manner to the front wall 411 of the surge car.

In operation, this assembly affords a unique control over the vertical deflection of the tail boom despite lateral movement of the same. Assuming that the tail boom is in horizontal position but deflected laterally to the amount indicated in Figure 6 (to the right), which is approximately 20°, the curved characteristics of the rail 532 permit a deflection of the boom to the left 40° without any alteration in the distance of the boom above the floor. This factor can be appreciated when it is considered that if the curved rail 532 is not so formed as to represent a compound curve (i. e., curved with respect to both vertical and horizontal planes), a lateral deflection of the boom when it is in a given elevated position (e. g., 5° off the horizontal) will alter that angular distance above the room floor. By this mechanism and as stated, once the vertical height is set the boom may be moved to the right or left without appreciable increase or decrease of that height. The advantage of such apparatus is obvious—any other means to deflect the boom to right or left without such mechanism to maintain it at a predetermined and desired level must necessarily include complex lifting or hoisting machinery. Such is not required in the present instance.

*The tractor mechanism*

We have provided a unique tractor drive for the surge car and related apparatus in that it is extremely low in height but provides a maximum of tractive contact with the room floor. Also, in the following description of this aspect of our invention, it will be seen that the tractor treads themselves are modified by a basic principle involving, in effect, friction rollers for contacting the frame about which the separate treads revolve. This is in sharp contrast to the ordinary type of tractor mechanism wherein the links or separate treads are simply dragged across their respective supporting frames. By utilizing this form of antifriction means for propulsion of the treads, it is apparent that nothing is lost in the reduction in height of the tread mechanism but, on the contrary, the treads can be made extremely wide, will operate efficiently despite their low stature and gain a maximum in tractive contact with the supporting surface on which the surge car rests.

As heretofore explained, the two series of treads which support the surge car directly engage the latter through a series of yokes 320. In this instance, three of such yokes are employed on each side of the surge car and the same are clearly illustrated in Figures 12 and 13. These yokes constitute the main support for the car and its related mechanism as, by reference to Figure 14, it is seen that they are directly welded or otherwise secured to the main frame members 288, 289 of the car. They also directly contact, and may be affixed to, the lower beds 300, 301 which support the twin flight and drag chain conveyors on their return cycle. Similarly, such yokes may also be secured to opposed angle irons 322, 323, seen in Figure 14 and secured to the respective outside walls 100, 101 of the surge car body. It is also desirable to close off the interior of the tread mechanism to the outside by attaching a series of plates 324 to the outside wall of the car body, which plates extend downwardly to engage the exterior sides of the respective yokes 320.

By reference to Figure 13, it is seen that each of the treads 630 is mounted upon and in rolling or antifriction contact with a basic framework extending throughout the length of the drive mechanism. This framework consists essentially of an H-beam construction comprised of top and bottom members 600, 602, respectively, and a spreader 601 centrally positioned therebetween. Such an H construction is welded to two opposed channel beams 610, 611, the latter having the webs thereof positioned outwardly. These channel beams are devised to provide a base for the several rails upon which the rollers of the several treads freely ride. Thus, channel beam 610 has welded to it two such tracks 615, 618, and channel beam 611 is fitted with two similar tracks 620, 622. Each pair of rails or tracks are mounted in parallel relationship with respect to each other. They are spaced the same distance apart and extend throughout the length of the tractor mechanism to a point short of the end sprockets which drive the treads.

Each of the tractor treads 630 are secured to a roller mechanism in the same way. Here it is seen that each tread is secured by rivets 634 to right-angular brackets 629. These actually form the links of a continuous chain for a roller system upon which the series of treads are propelled. Viewing Figure 13, it is seen that these brackets or links 629 are right-angular in configuration and apertured to receive a suitable pin or rivet 632. A roller 642 rides upon each of such pins between the brackets 629. The several rollers, as thus mounted, are adapted to ride upon the rails 615, 618, 620 and 622. The latter are fitted together in staggered relationship, as is usual in such cases. By this is meant an overlying bracket will be interconnected with an underlying bracket, such as will be readily understood by reference to Figure 12. The referred to pins 632 lock adjacent brackets together. By this manner of interconnection, and as further explained hereinafter, the separate treads are in close contact with the floor while in parallel relationship, whereas during the turning of the tread over the driving sprockets at each end of this assembly, the treads separate to loosen and discharge any material that has become imbedded between them.

These separate pairs of rails, such as rails 615, 618, are separated by tongues 650 which terminate on their outer sides in flanges 652, 653 equal in thickness to the separate rails. Furthermore, a separating element 650 is provided with an additional outwardly extending flange or extension 660 and it is upon this latter member that the entire weight of the surge car body rests. These extensions 660 are surmounted by outside plates 662 secured as by bolts 664 at intervals throughout their longitudinal length, in this instance three being shown for each yoke unit. The referred to yokes 320 are provided with horizontal flanges 665 that are designed to be maintained in position by the referred to plate 662, and a resilient cushion of rubber or other synthetic material 668 is positioned in between these flanges 665 and a complementary rail or flange 667. The latter is also maintained in place in between member 652 and the referred to plate 662. It is obvious that by this construction, the yokes 320 are secured against lateral displacement with respect to the individual tread set-up and, as well, contact, insofar as the weight of the surge car be concerned, only the resilient, cushion 668. Such is an assurance against fracture of the assembly due to overload or unusual stress.

Each tread assembly is driven and carried by a pair of rearward and a pair of forward sprocket wheels. Thus, referring to Figures 15 and 17, the sprockets at the inby end of the surge car are represented at 700, 701, and those at the outby end at 702, 704. It is to be noted that the concavity between adjacent teeth of these sprockets is of a configuration that approximates the shape of the rollers 642. In other words, a substantial portion of the curve between separate teeth of the individual sprockets are made on a radius approximately matching that of the radius of each supporting roller. Thus, these rollers not only carry the weight of the car in an antifriction relationship, but also considerably reduce friction at the point of contact with the individual sprockets.

The forward sprockets 700, 701 are journaled in the sliding block of a take-up mechanism which will later be referred to. The rear sprockets 702, 704 are journaled in the side frame members 610, 611 constituting the main framework of this tractor assembly, as already described.

The pair of sprockets at the inby end of the device are provided with means to automatically take-up any slack due to wear in the assembly. Such take-up device is based upon a hydraulic system similar to that described with reference to the twin conveyor take-up means. Here, two hydraulic cylinders 716, 718 act in unison to exert thrust against the shaft upon which the separate sprockets ride. Such cylinders are pivoted at one end on pivot pins 719, 720, these respective pivots each being supported on a suitable yoke means 727. The referred to pins engage apertures or projections 725, 726 formed upon the end of the referred to hydraulic cylinders.

Such hydraulic cylinders are interconnected to two sliding members, also in the nature of slides or pistons 740, 742. These ride respectively in cylinders 745, 746 for sliding movement therewith so that when the hydraulic means is extended, the slides 740, 742 are also extended to advance forwardly the shafts and sprockets with which they are interconnected.

The cylinders 745, 746 are spaced from top and bottom by spacers 750, also supplied as strengtheners.

Each of these sliding pistons 740, 742 is fitted with a yoke means 761, 771, respectively, which engage pins 762, 772 to pivotally interconnect them with the hydraulic means, the two cylinders previously referred to. The latter are provided with apertures in their respective piston rods 763, 773 through which the pivot pin in each instance is positioned.

At the inby end of this structure, a plate 775, suitably bored to permit egress of the twin slides 740, 742, is welded to the framework supporting this reciprocating means. The slides are fitted with bearing members 770, 772 in the form of extensions thereto and which terminate in a rounded configuration as shown in Figure 18. The drive sprockets for the tractor treads at the inby end, sprockets 700, 701, are keyed to shaft 778 and the latter journaled in the described bearing members 770, 772. As indicated in the foregoing, the latter terminate in a configuration which approximates the curvature of the periphery of the several sprockets. Such members are directly interconnected by any suitable means with the two slidable cylinders 740, 742, or may be made integral therewith. The latter, as hereinbefore described, are of considerable strength and adapted to withstand the heavy loads which necessarily fall upon such sprockets.

It is to be understood that the foregoing description, made with reference to Figures 17 and 18, has been directed to a take-up means for the tractor mechanism which is common to the other pair of sprockets on the other side of the tractor arrangement.

As shown in Figures 17 and 18, the amount of extension of the sliding members 740, 742 is substantial, the sprockets in extended position being shown in dotted line. In any event, such is sufficient to effectively take-up any slack occurring through wear or from other operative difficulties in the tread mechanism.

Since this take-up mechanism operates on the same principle as that discussed with reference to the take-up in the twin conveyor apparatus, it is preferred that hydraulic pressure from the main fluid supply be constantly admitted to the two cylinders 716, 718 at about the same pressure—100 p. s. i. There being two hydraulic means exerting thrust on each side of the shaft upon which these sprockets rotate, and a constant non-changing pressure behind each cylinder, it will be appreciated that forward thrust or stress exerted by this combination of elements will be constant and unchanging. Such is in sharp contrast to the usual form of take-up means, using helical springs, for example, where the thrust is necessarily a variant dependent upon the amount of tension or compression such springs are subjected to.

The driving means for propelling the two sets of tractor treads is illustrated with some particularity in Figures 15 and 16. It is to be understood that although the power source (such as a hydraulic motor) is not shown in these figures, the same is located above the treads and within the main body of the surge car. A suitable location may be within the respective sides 5 and 10, which, as stated, are of considerable width containing spaced walls 100, 111 on the one hand and spaced walls 101, 110 on the other.

In any event, from such power source, so located in a manner that would be well within the skill of the art, a drive chain 800 is interconnected with the motor and positioned to drive sprocket 803, the latter being keyed to the usual type of shaft 807. This shaft is journaled in a suitable bearing block 810 which, as seen in Figure 15, extends from the side wall 610 of the main frame through the divider 601. This shaft, at its opposite end, is fitted with a suitable drive pinion which is keyed to and otherwise maintained in position by bolt 815 to the shaft. Such gear transmits power through a first gear 820 of a transmission or gear arrangement of the reduction type adapted to reduce speed of shaft 807 to that desired for practical utility. This transmission is not shown. However, it would be of any ordinary type and its construction, to accomplish the purposes herein set forth, would be well understood by those skilled in the art.

From the gear reduction mechanism, power is transmitted through a bull gear 826 to shaft 714 which, as stated, is journaled in the two frame members 610, 611 and on which is keyed the two drive sprockets 702, 704. The entire arrangement is such that the drive mechanism occupies a minimum of space, yet efficiently permits ease of handling of the surge car and related mechanism.

In order to protect this drive as much as possible, we have found it desirable to cover the moving parts thereof, leaving only the treads extending downwardly a short distance for ready contact with the surface. Accordingly, each tread is covered at its rearward end by a curved plate 840 which is flanged on its sides and extends forwardly or toward the inby end to engage two additional plates 842, 844. The latter extend inwardly an appreciable distance so that (see Figure 16) it will be appreciated that all of the moving parts involved in driving the separate tread assemblies, including the drive sprockets as well as the sprockets at the inby end, are well protected from foreign matter which might well interfere with the proper operation thereof. Like plates cover the tread arrangement at the inby, or opposite, end of the tractor mechanism.

The foregoing discussion particularly relates to the drive means for the tread mechanism on what might be termed the starboard side of the surge car—in other words, that tread assembly which is illustrated in Figure 12. However, the same form of drive, in all particulars, can be utilized on the other or port side of the surge car with equal facility. As indicated in the foregoing, the power source for such drive media in both instances can be positioned within the side walls 5 and 10, respectively, of the surge car. In any event, these two drive assemblies are independently controlled. This permits variation in speed between the two assemblies or even reversal of direction of one with respect to the other so that the surge car can perform the function of turning in a relatively tight circle. As will be well-understood, such can be accomplished by maintaining one drive stationary and urging the other forward or reversing the two drives with respect to each other.

In the preferred embodiment of our invention, we have also provided an improved type of tractor tread to which brief reference has been made in the foregoing. Such tread is particularly referred to in Figure 21. Here it is seen that the tread 630 is dished or grooved as at 900 along its center line or with relation to the surge car itself, right-angularly to the direction of travel thereof. This dishing or grooving results in the creation of two protuberances or ridges 902, 904 on each side of the tread. The external surfaces of such ridges have concave depressions 906, 908 extending towards the respective edges of the tread. As to such edges, it is seen that one of the same is of convex configuration as at 912, the other edge 915 is of concave configuration. This enables the seating of edge 912 in comparatively close contact with the edge 915 of an adjacent tread so that in operation the entire series of treads offers a continuous, smooth and, relatively speaking, closed surface at all points of contact with the room floor. This can be appreciated by reference to Figure 12 where, as well, it will be seen that the individual treads, while circumventing the curvature of the respective sprockets, are separated with respect to each other. Such separation during each reversal of travel of the treads facilitates discharge of foreign matter which may have become imbedded between them.

The individual treads are self-cleaning in this respect as well as in their ability to shake free foreign matter from the exterior and contacting surfaces thereof by reason of the substantial groove 900 which, as stated, transverses the central portion of the face of each tread. With this shape, movement and consequent vibration of the surge car results in a shaking free of such foreign matter with much more facility than were the treads of the usual type where, normally, each tread is flat throughout its entire surface, substantially separated from its adjacent tread and lacking in the curved edges which permit presentation of an even and continuous surface to the floor.

As briefly referred to in the foregoing, the surge car can be manipulated by the operator from a position near any one of its four corners. Although only two control panels 65, 70 are shown in Figure 1, it is to be understood that duplicate sets of controls may be provided in like position in the opposite side of the car. These controls are not shown in greater detail here as they simply involve the use of four-way valves or like standard equipment to direct hydraulic fluid from the main fluid pressure supply to the various hydraulic motors or hydraulic cylinders which have heretofore been described. Thus, the control units generally indicated at 70 (Figure 1) are positioned to place the surge car in motion; raise or lower the clean-up scoop; raise, lower or incline laterally the boom conveyor; and actuate the twin boom, link and drag bar conveyor systems. Such a set of controls is typical of those but diagrammatically indicated at 65 (Figure 1), and of those which are placed in identical position on the opposite side of the surge car.

From the foregoing description, those skilled in the art will appreciate that we have devised a mechanism that represents the extreme in flexibility.

The following features, inter alia, materially contribute to the novel combination constituting this invention: a surge car which is provided wih a bridge conveyor that is adjustable in vertical and horizontal planes, yet rides above and on such surge car so as to be positioned with respect thereto in any predetermined location, thereby permitting filling of the surge car in an even and constant manner throughout its length; the application of twin conveyor units to a surge car which, although low in height, is of substantial storage capacity to accommodate the intermittent and periodic discharge of mined material to the car yet facilitating a controlled delivery to the usual form of shuttle haulage; the inclusion of a boom conveyor system, also adjustable in both vertical and horizontal planes with means to maintain such boom conveyor at a selected level above the room floor despite lateral deflection thereof to one side or the other of the surge car; a take-up mechanism employing the constant pressures of a hydraulic system which may be utilized with any of the conveyor units or the tractor drive, but is of particular utility with respect to the latter and with respect to the twin conveyor units; and, finally, tractor treads that are inherently self-cleaning and adapted to interfit edge to edge with each other in such manner that a continuous relatively smooth surface with large tractive capacity is presented to the floor, such treads being so positioned as to substantially separate when driven around their respective end sprockets, thereby further facilitating the stated self-cleaning function.

This equipment, in comparison to mining machinery in general, also represents the essence of simplicity and, hence, such surge car units may be easily mass produced at low cost. Also, the invention is most adaptable to achieve the aims which have been expressed in the objectives heretofore recited, the primary one of which is the smoothing out or constancy of delivery of materials to a shuttle car system when the known propensity of continuous mining machines in general complicates the transportation system by the intermittent or discontinuous cycles of operation characteristic of such machines.

The foregoing somewhat specifically describes one form of our invention which has been found to be of great practical and commercial utility. However, it is to be understood that this embodiment has been described merely for purposes of illustration and that the invention may be modified and embodied in various other forms without departing from the spirit or scope of the claims appended hereto.

We claim:

1. In a surge car conveying and temporary material storage means for operation on a mine room floor, the combination of a main frame having upwardly extending side walls, a tractor means, said frame being mounted on said tractor means, at least two adjacent chain and flight conveyors between said side walls, track means on the upper edge of each of said walls, a rotatable and vertically deflectable bridge conveyor positioned for reciprocation on said track means, a boom conveyor provided with flights positioned underneath one end of said adjacent conveyors for reception of materials discharged therefrom, means to maintain said boom conveyor at the same predetermined height above said floor despite lateral deflection thereof, said last-named means including curved rail means on said boom conveyor and adjustable supporting hydraulic means bearing against said rail means, said boom flights being substantially wider than the flights of each of said adjacent flight conveyors, and means for actuation of each of said recited conveyor means.

2. In a surge car conveying means for operation on a mine floor, a main frame having a central storage space, a rotatable and vertically adjustable conveyor mounted for longitudinal travel on said frame, twin conveyor units within said frame, one end of said frame having a boom conveyor for discharge of material received by said adjustable twin conveyors, means in association with said boom conveyor to maintain said boom conveyor at a uniform height above said floor despite lateral deflection thereof, said means comprising a curved rail on the underside of said boom conveyor and hydraulic means bearing against said rail, said twin units having a material receiving capacity greater than the capacity of said adjustable and boom conveyors and control means adjacent each corner of said frame for operation of said several conveyors.

3. In a surge car conveying means for operation on a mine floor, a main frame having a central storage space, a track extending longitudinally of said frame, a ring means mounted for reciprocation on said track, a vertically adjustable conveyor mounted for rotation on said ring means, twin conveyor units within said frame, one end of said frame having a boom conveyor for discharge of material received by said adjustable twin conveyors, the inby end of said boom conveyor being positioned under the outby end of said twin conveyors, means in association with said boom conveyor to maintain said boom conveyor at a uniform height above said floor despite lateral deflection thereof, said last-named means comprising a curved rail on the underside of said boom conveyor and extending downwardly therefrom, a hydraulic means pivoted at one end, said hydraulic means being in supporting contact with said rail at the opposite end thereof, said storage space having a material receiving capacity greater than the capacity of said adjustable and boom conveyors and control means adjacent each corner of said frame for operation of said several conveyors.

4. In a surge car conveying and temporary material storage means for operation on a mine floor, a main frame having a central storage space, a rotatable and vertically adjustable conveyor mounted on said frame having means for longitudinal travel thereon, said space being divided into twin compartments, twin conveyor units within said twin compartments, one end of said frame having a vertically and rotatably adjustable boom conveyor for discharge of material received by said adjustable twin conveyors, means in association with said boom conveyor to maintain said boom conveyor at a uniform height above said floor despite lateral deflection thereof, said last named means including a curved supporting rail under said boom conveyor and a hydraulic cylinder provided with means to exert upward, supporting thrust against said rail, said twin units having a material receiving capacity greater than the capacity of said adjustable and boom conveyors and control means adjacent each corner of said frame for operation of said several conveyors.

5. In a conveyor unit adapted to receive intermittent output of mined materials, means to store and regulate delivery of said output, said means including a plurality of adjacent conveyors mounted in the same plane, a pivotally mounted conveyor above said conveyors and movable longitudinally with respect thereto, an outby boom conveyor in material receiving interconnection with said adjacent conveyors, means to maintain said boom conveyor at any predetermined height above room floor during lateral deflection thereof, said adjacent conveyors being provided with substantial material retaining side walls for temporary storage of said mined material, said side walls at one end thereof having an adjustable closure means, said closure means being rotatable downwardly to provide a scoop for scraping up loose materials for discharge into said adjacent conveyors, a tractor tread mechanism, said recited conveyors being mounted on said mechanism for movement thereof on said floor, and control means adjacent each end of said adjacent conveyors for propulsion of said adjacent, adjustable and boom conveyors and said tread mechanism.

6. In a conveyor unit adapted to receive intermittent output of mined materials, means to store and regulate delivery of said output, said means including a plurality of adjacent conveyors mounted in the same plane, a pivotally mounted conveyor above said conveyors and movable longitudinally with respect thereto, an outby boom conveyor in material receiving interconnection with said adjacent conveyors, means to maintain said boom conveyor at any predetermined height above room floor during lateral deflection thereof, said last named means comprising a curved supporting rail under said boom conveyor near the axis of lateral movement thereof and a hydraulic cylinder provided with means to exert upward, supporting thrust against said rail, said adjacent conveyors being provided with substantial material retaining side walls for temporary storage of said mined material, a tractor tread mechanism, said recited conveyors being mounted on said mechanism for movement thereof on said floor, and control means adjacent each end of said adjacent conveyors for propulsion of said adjacent, adjustable and boom conveyors and said tread mechanism.

7. In a conveyor unit adapted to receive intermittent output of mined materials, the combination of a main frame having opposed side walls providing a substantial storage space, a track on each of said walls, a ring means mounted for reciprocation on said tracks, means to regulate delivery of said output, said means including a plurality of adjacent conveyors mounted in the same place between said side walls, a vertically tiltable conveyor in rotatable engagement with said ring whereby said tiltable conveyor may rotate with respect to said frame, an outby boom conveyor in material receiving interconnection with said adjacent conveyors, means to maintain said boom conveyor at any predetermined height above room floor during lateral deflection thereof, said last named means comprising a curved rail in the underside of said boom conveyor near the axis of lateral movement thereof and a hydraulic means to exert upward, supporting thrust against said rail, a tractor tread mechanism, said recited conveyors being mounted on said mechanism for movement thereof on said floor, and control means adjacent each end of said adjacent conveyors for propulsion of said adjacent, adjustable and boom conveyors and said tread mechanism.

8. In a surge car receiving and material delivery regulating mechanism, the combination of a main frame having substantial upwardly extending side walls, at least two adjacent chain and flight conveyors between said walls, means at one of the ends to drive said conveyors, take-up means for said conveyors at the opposite ends thereof, a central dividing member between said conveyors, said member being approximately half the height of said walls, a pivoted boom conveyor adapted to be deflected laterally at one end of said mechanism, said boom conveyor being in material receiving interconnection with said adjacent conveyors and having flights of a width approximately one-third again larger than the width of one of said adjacent conveyors, said boom conveyor being provided with a curved rail means upon the underside thereof, a pivoted hydraulic means adapted to bear against said rail means to support said boom conveyor at the same height above room floor despite lateral deflection thereof, tractor supporting means for said frame and boom conveyor and means to drive the flights of said boom conveyor at speeds substantially in excess of the speeds of operation of said adjacent conveyors.

9. In a surge car receiving and material delivery regulating mechanism, the combination of a main frame having a base and substantial upwardly extending side walls, at least two adjacent chain and flight conveyors between said walls, means at one of the ends to drive said conveyors, take-up means for said conveyors at the opposite ends thereof, a central dividing member between said conveyors, said member being approximately half the height of said walls, said conveyors and said member being angled upwardly approximately 30° to provide a substantial space between said base and the outby end of said conveyors, a pivoted boom conveyor adapted for movement in both lateral and vertical directions at one end of said mechanism, the inby end of said boom conveyor being positioned within said space, said boom conveyor being in material receiving interconnection with said adjacent conveyors and having flights of a width approximately one-third again larger than the width of one of said adjacent conveyors, means to maintain said boom conveyor at a predetermined height with respect to said frame despite lateral deflection thereof, said last-named means including a curved rail mounted upon the underside of said boom conveyor and adjustable hydraulic means adapted to exert thrust against said rail means, tractor supporting means for said frame and boom conveyor and means to separately drive said recited conveyors.

10. In a surge car conveying apparatus for use with continuous mining machines and having a material receiving compartment provided with twin chain and flight assemblies, a boom conveyor adapted to move in vertical and horizontal directions with respect to said compartment, means for maintaining said boom conveyor in a predetermined elevated position despite lateral deflection thereof, said means comprising a curved rail means mounted underneath said boom conveyor and hydraulic means adapted to exert thrust against said rail means, roller receiving tracks positioned longitudinally of said compartment and on each side thereof, a bridge conveyor mounting including a frame disposed transversely of said compartment, two pairs of opposed, spaced rollers on each side of said frame, each pair of opposed rollers being adapted to receive one of said tracks therebetween, a ring means on said frame in horizontal alignment with said compartment, roller plates on opposed sides of said ring means, said plates supporting grooved rollers adapted to engage said ring means, said plates being pivotally interconnected to said frame, said frame carrying a conveyor assembly including a chain and flight arrangement, and means to drive said arrangement, whereby said bridge conveyor can be moved longitudinally of said compartment, and rotated and angled vertically with respect thereto.

11. In a surge car conveying apparatus for use with continuous mining machines and having a material receiving compartment provided with twin chain and flight assemblies, a boom conveyor adapted to move in vertical and horizontal directions with respect to said compartment, means for maintaining said boom conveyor in a predetermined elevated position despite lateral deflection thereof, said means comprising a curved rail means mounted underneath said boom conveyor and hydraulic means adapted to exert thrust against said rail means, roller receiving tracks on each side of said compartment, a bridge conveyor mounting including a frame disposed across said compartment, pairs of opposed, spaced rollers on each side of said frame, each pair of opposed rollers being adapted to receive said tracks therebetween, a ring means on said frame in horizontal alignment with said compartment, roller plates on opposed sides of said ring means, said plates supporting grooved rollers adapted to engage said ring means, said plates being pivotally interconnected to said frame, whereby said bridge conveyor can be moved longitudinally of said compartment, and rotated and angled vertically with respect thereto.

12. In a surge car conveying apparatus for use with continuous mining machines and having a material receiving compartment provided with twin chain and flight assemblies, a boom conveyor adapted to move in vertical and horizontal directions with respect to said compartment, means for maintaining said boom conveyor in a predetermined elevated position despite lateral deflection thereof, said means comprising a curved rail means mounted underneath said boom conveyor and hydraulic means adapted to exert thrust against said rail means, roller receiving tracks on each side of said compartment, a bridge conveyor mounting including a frame disposed across said compartment, pairs of opposed, spaced rollers on each side of said frame, each pair of opposed rollers being adapted to receive said tracks therebetween, a ring means on said frame in horizontal alignment with said compartment, said bridge conveyor having means to rotate about said ring means, whereby said bridge conveyor can be moved longitudinally of said compartment, and rotated and angled vertically with respect thereto.

13. In a surge car conveying and temporary material storage means for operation on a mine room floor, the combination of a main frame having upwardly extending side walls, a plurality of flight conveyors within said side walls, a rotatable and vertically deflectable bridge conveyor positioned for reciprocation on said side walls, a boom conveyor positioned at one end of said adjacent conveyors for reception of materials discharged therefrom, means to maintain said boom conveyor at a uniform height above said floor despite lateral deflection thereof, said last-named means comprising a curved rail mounted on said boom conveyor, said rail being of compound curve formation comprising two arcs, one of said arcs lying in a series of vertical planes and one of said arcs being positioned in a horizontal plane, adjustable hydraulic means pivoted at one end and bearing against said rail at the other end thereof, whereby said boom conveyor is maintained at a predetermined height above floor level during lateral deflection thereof, and means for actuation of each of said recited conveyor means.

14. In a surge car conveying and temporary material storage means for operation on a mine room floor, the combination of a main frame having upwardly extending side walls, tractor means for movement of said frame over said floor, track means on said side walls, twin flight conveyors within said side walls, a rotatable and vertically deflectable bridge conveyor positioned for reciprocation on said track means, a boom conveyor positioned at one end of said adjacent conveyors for reception of materials discharged therefrom, said boom conveyor being disposed underneath said twin conveyors at one end thereof and in material receiving position with respect thereto, means to maintain said boom conveyor at a uniform height above said floor despite lateral deflection thereof, said last-named means comprising a curved rail mounted on said boom conveyor, said rail being of compound curve formation comprising two arcs, one of said arcs lying in a series of vertical planes and one of said arcs being positioned in a horizontal plane, adjustable hydraulic means pivoted at one end to said frame, the opposite end of said hydraulic means being provided with a roller contact means, said roller contact means being adapted to engage said rail in movable, supporting relationship, whereby said boom conveyor is maintained at a predetermined height above floor level during lateral deflection thereof, and means for actuation of each of said recited conveyor means.

References Cited in the file of this patent

UNITED STATES PATENTS

| | | |
|---|---|---|
| Re. 20,883 | Clarkson | Oct. 18, 1938 |
| 1,408,299 | Holley | Feb. 28, 1922 |
| 1,780,299 | Jackson | Nov. 4, 1930 |
| 1,908,434 | Madeira | May 9, 1933 |
| 1,932,897 | Jaggard | Oct. 31, 1933 |
| 2,168,053 | Starr | Aug. 1, 1939 |
| 2,177,936 | Esters | Oct. 31, 1939 |
| 2,196,659 | Cartlidge | Apr. 9, 1940 |
| 2,290,950 | Duncan | July 28, 1942 |
| 2,354,336 | Sloane | July 25, 1944 |
| 2,479,823 | Ernst | Aug. 23, 1949 |
| 2,514,993 | Ernst | July 11, 1950 |
| 2,623,630 | Erickson | Dec. 30, 1952 |
| 2,695,700 | Lindgren et al. | Nov. 30, 1954 |
| 2,696,104 | Markey et al. | Dec. 7, 1954 |
| 2,719,642 | Barrett | Oct. 4, 1955 |
| 2,725,976 | Madeira | Dec. 6, 1955 |
| 2,747,721 | Long et al. | May 29, 1956 |